US 6,751,777 B2

(12) United States Patent
Bates et al.

(10) Patent No.: US 6,751,777 B2
(45) Date of Patent: *Jun. 15, 2004

(54) MULTI-TARGET LINKS FOR NAVIGATING BETWEEN HYPERTEXT DOCUMENTS AND THE LIKE

(75) Inventors: Cary Lee Bates, Rochester, MN (US); Paul Reuben Day, Rochester, MN (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/174,952

(22) Filed: Oct. 19, 1998

(65) Prior Publication Data

US 2003/0188263 A1 Oct. 2, 2003

(51) Int. Cl.$^7$ .............................................. G06F 17/21
(52) U.S. Cl. .................................. 715/501.1; 715/513
(58) Field of Search .............................. 707/501.1, 513, 707/1–4, 104.1; 709/217–219, 232–235, 238, 223; 715/501.1, 513

(56) References Cited

U.S. PATENT DOCUMENTS

| | | | |
|---|---|---|---|
| 5,050,071 A | 9/1991 | Harris et al. ................. 364/200 |
| 5,204,947 A | 4/1993 | Bernstein et al. ............ 395/157 |
| 5,297,249 A | 3/1994 | Bernstein et al. ........... 395/156 |
| 5,379,424 A | * 1/1995 | Morimoto et al. .............. 707/2 |
| 5,572,643 A | 11/1996 | Judson ........................ 395/793 |
| 5,721,908 A | 2/1998 | Lagarde et al. .............. 395/610 |
| 5,724,595 A | 3/1998 | Gentner ....................... 395/762 |
| 5,742,768 A | 4/1998 | Gennaro et al. ........ 295/200.33 |
| 5,751,961 A | * 5/1998 | Smyk ........................... 709/217 |
| 5,761,683 A | 6/1998 | Logan et al. ................. 707/513 |
| 5,774,123 A | 6/1998 | Matson ........................ 345/357 |
| 5,774,660 A | * 6/1998 | Brendel et al. .............. 709/201 |
| 5,778,181 A | 7/1998 | Hidary et al. ........... 395/200.48 |
| 5,778,372 A | 7/1998 | Cordell et al. ............... 707/100 |
| 5,787,470 A | 7/1998 | DeSimone et al. .......... 711/124 |
| 5,790,793 A | 8/1998 | Higley .................... 395/200.48 |
| 5,802,299 A | 9/1998 | Logan et al. ........... 395/200.48 |
| 5,809,247 A | 9/1998 | Richardson et al. ... 395/200.48 |
| 5,813,007 A | 9/1998 | Nielsen ........................ 707/10 |
| 5,822,539 A | * 10/1998 | van Hoff ...................... 709/236 |
| 5,838,906 A | 11/1998 | Doyle et al. ............ 395/200.32 |

(List continued on next page.)

FOREIGN PATENT DOCUMENTS

EP  0 779 586 A1  6/1997

OTHER PUBLICATIONS

Weis, Ron, et al, "HyPursuit: A Hierarchical Network Search Engine that Exploits Content–Link Hypertext Clustering", Hypertex '96, ACM 0–89791–778–2/96/03, pp. 180–193, 1996.*

(List continued on next page.)

Primary Examiner—Stephen S. Hong
(74) Attorney, Agent, or Firm—Wood, Herron & Evans, LLP

(57) ABSTRACT

An apparatus, program product, and method utilize a multi-target link to selectively access data located at one or more of a plurality of storage locations associated with the link. Thus, when a user activates a particular multi-target link, a request may be forwarded to different storage locations in different circumstances to optimize utilization of the link, rather than the request being forwarded to the same single storage location as occurs with conventional hypertext links and bookmarks. A multi-target link may be implemented as a hypertext link defined by a hypertext link definition embedded in a hypertext document, or as a bookmark for use in a custom bookmark list for a user. Moreover, various types of data, including hypertext documents, files, and the like, may be accessed from one or more of the storage locations for a multi-target link.

75 Claims, 14 Drawing Sheets

U.S. PATENT DOCUMENTS

| | | | | |
|---|---|---|---|---|
| 5,870,770 | A | * | 2/1999 | Wolfe .......................... 345/805 |
| 5,873,107 | A | * | 2/1999 | Borovoy et al. .......... 707/501.1 |
| 5,905,991 | A | * | 5/1999 | Reynolds ................. 707/501.1 |
| 5,918,237 | A | * | 6/1999 | Montalbano ................. 715/513 |
| 5,963,964 | A | * | 10/1999 | Nielsen ................... 715/501.1 |
| 5,987,482 | A | * | 11/1999 | Bates et al. ................. 707/513 |
| 6,092,074 | A | * | 7/2000 | Rodkin et al. .............. 707/102 |
| 6,098,081 | A | * | 8/2000 | Heidorn et al. .......... 715/501.1 |
| 6,112,239 | A | * | 8/2000 | Kenner et al. .............. 709/224 |
| 6,115,752 | A | * | 9/2000 | Chauhan .................... 709/241 |
| 6,122,647 | A | * | 9/2000 | Horowitz et al. ........... 707/513 |
| 6,189,019 | B1 | * | 2/2001 | Blumer et al. .............. 707/513 |
| 6,208,995 | B1 | * | 3/2001 | Himmel et al. .......... 707/104.1 |
| 6,230,196 | B1 | * | 5/2001 | Guenthner et al. ......... 709/223 |
| 6,278,449 | B1 | * | 8/2001 | Sugiarto et al. ............ 345/826 |
| 6,345,303 | B1 | * | 2/2002 | Knauerhase et al. ........ 709/238 |
| 6,356,922 | B1 | * | 3/2002 | Schilit et al. ............... 707/512 |
| 6,385,641 | B1 | * | 5/2002 | Jiang et al. ................. 709/203 |
| 6,460,058 | B2 | * | 10/2002 | Koppolu et al. ............ 345/738 |

OTHER PUBLICATIONS

M.R. Brown, "Special Edition: Using Netscape™2," (Indianapolis: Que Corporation, 1995), pp. 233–257, 285, and 793.

H. Schulzrinne, "World Wide Web: Whence, Whither, What Next?" IEEE Network, IEEE Inc., vol. 10, No. 2, Mar. 1996, pp. 10–17.

M. Brown, Special Edition: Using Netscape (TM) 2, 1995, Que Corporation, pp. 148–174, 220–253, and 678.

* cited by examiner

MULTI-TARGET LINKS FOR NAVIGATING BETWEEN HYPERTEXT DOCUMENTS AND THE LIKE

FIELD OF THE INVENTION

The invention is generally related to computers and computer software. More specifically, the invention is generally related to the display of and navigation between hypertext documents with browser computer programs and the like.

BACKGROUND OF THE INVENTION

The amount and variety of information that can be accessed through a computer continues to increase at an astounding rate. The Internet, in particular, has enabled computer users to access a wide variety of information from other computers located all over the world.

Much of the information accessible via the Internet is organized into hypertext documents, which are typically documents formatted in a language known as Hypertext Markup Language (HTML), and which are accessed via a segment of the Internet known as the World Wide Web. Hypertext documents typically include one or more embedded "hypertext links" that an end user can select to either jump to different documents, or to jump to different locations within the same document. Each hypertext document typically is identified by the storage location (known as a Uniform Resource Locator (URL)) at which the document is stored, with a hypertext link to a particular document, or "target", specifying the storage location of that document so that, upon selection of the link, that document may be retrieved.

A wide variety of other information such as text, graphics, video, sound, and animation may be integrated into hypertext documents, and moreover, these documents can be organized into "sites", typically maintained by a single entity, that collect multiple related documents together in a coherent fashion. Furthermore, due to the immense popularity of the World Wide Web, many private computer networks now also support hypertext documents, as do a number of existing computer operating systems and computer software applications.

A computer program, often referred to as a browser, is typically used to navigate between and through hypertext documents. With a browser, an end user can use a mouse or other pointing device to point and click on links such as highlighted text, images or other user interface components (e.g., buttons) in documents to navigate to different documents and/or to different locations within the same document.

Many browsers also support the use of bookmarks (also sometimes referred to as aliases, shortcuts or favorites), through which a user can maintain a list of favorite sites or documents that a user expects to revisit in the future. Retrieving a bookmarked document at a later date then only requires the user to locate the bookmark corresponding to a desired document in the list, and then select that bookmark to initiate retrieval of the document.

Conventional hypertext links and bookmarks may both be characterized as single-target links. Specifically, a conventional hypertext link or bookmark is associated with a single target, such that any time such a hypertext link or bookmark is activated, the document stored at its associated target is retrieved.

However, oftentimes there may be several targets relevant to a particular type of information that a user wishes to retrieve. For example, it is common for many web sites to be "mirrored", where multiple identical copies of the documents in a web site are stored on multiple computers (also known as "servers") accessed at different storage locations to permit a greater number of users to access such documents at any given time. As another example, it may be desirable to provide multiple copies of a document in several languages so that, for example, a user who speaks English can retrieve an English-language version of a document, while a user who speaks Spanish can retrieve a Spanish-language version.

With conventional hypertext links and bookmarks limited to single targets, multiple hypertext links or bookmarks often must be used to support multiple targets for a given topic or type of information. If multiple hypertext links are displayed in a given hypertext document, however, the document may become relatively cluttered, and hence less visually appealing. Similarly, bookmarking multiple targets can lead to cluttering up of a bookmark list, often making it more difficult for a user to find specific bookmarks in the list.

Perhaps more importantly, however, is the fact that the use of multiple single-target links to provide access to multiple targets requires some degree of user effort and decision making to select the most appropriate target among several alternatives. Just the fact that a user has to select between multiple links interrupts browsing, and often leads to decreased productivity. Furthermore, having a user manually select between multiple links introduces the possibility of human error, since a user may initially select the wrong link and have to navigate back to the original document, and then to another of the available choices.

Moreover, in many instances, the user may not have sufficient information to make a reasonable guess as to which is the most appropriate link to take. For example, most users desire to retrieve documents as quickly as possible. Thus, with mirrored web sites, a user is often encouraged to select a site that is closest geographically to the user, since it is presumed that the amount of "traffic" on the Internet between a user and a server decreases the closer the server is to the user. The speed at which a document may be retrieved, however, can also vary significantly depending upon other factors such as the workload of the server, the time of day, the actual amount of traffic on the portion of the Internet between the user and the server, etc. Without knowing these factors in advance, a user is often left picking a target at random, or simply based upon geographical proximity. As often as not, the user will not select the optimum server to handle his or her request, and may waste valuable time connected to a sub-optimum server.

Another difficulty with single-target links is that oftentimes documents stored at particular storage locations can become unretrievable, e.g., if the documents were moved to other storage locations, or if the documents were completely removed. As a result, any single-target link pointing to an unretrievable document becomes "stale" and unusable. A user often cannot recognize a stale link without first attempting to access its target, and then, if unsuccessful, attempting to locate the information by accessing other targets. This "wait and see" approach can often cause a great deal of user frustration and waste a significant amount of the user's time.

Attempts have been made to enable different documents to be retrieved in different circumstances in response to user selection of a single-target link. For example, some conventional web servers detect the brand of browser that a particular user is using, and then send back a particular version of a document optimized for that browser. Often, this requires that the servers obtain information from the user, typically in the form of "cookies" that may be requested by the servers. However, server-side document selection suffers from the drawback that additional processing is required to process each user request, which reduces the workload capacity of a server. Furthermore, users can disable the transmission of cookies and prevent a server from learning specific information about a user, thereby inhibiting a server from selecting from different documents in response to a particular request.

Consequently, the limitation of conventional hypertext links and bookmarks to single targets can adversely impact user productivity and lead to user frustration.

SUMMARY OF THE INVENTION

The invention addresses these and other problems associated with the prior art by providing an apparatus, program product, and method that utilize a multi-target link to selectively access data located at one or more of a plurality of storage locations associated with the link. Thus, when a user activates a particular multi-target link, a request may be forwarded to different storage locations in different circumstances to optimize utilization of the link, rather than the request being forwarded to the same single storage location as occurs with conventional hypertext links and bookmarks.

A multi-target link may be implemented as a hypertext link defined by a hypertext link definition embedded in a hypertext document, or as a bookmark for use in a custom bookmark list for a user. Moreover, various types of data, including hypertext documents, files, and the like, may be accessed from one or more of the storage locations for a multi-target link.

By associating more than one storage location with a hypertext link or bookmark, a wide variety of unique features may be supported.

For example, in some implementations, a selected storage location may be selected from the plurality of storage locations for a multi-target link based upon a predetermined selection criteria. As one example, the version type of documents stored at different storage locations may be used to select a particular type of document, e.g., so that a user could specify that he or she wanted to view a text-only version of a document rather than an image-enabled version. As another example, the relative access times for different storage locations may be used to select the storage location to optimize the retrieval of a document from a fastest, or more responsive, location. As yet another example, the relative ages of the documents at different storage locations may be used to select the storage location having the most recent and up-to-date document.

As a further example, a chronological criteria may be used to retrieve documents from different storage locations at different times. This would permit a user to, for example, retrieve a current market conditions document while a stock market was open, but to retrieve a daily summary document once the market was closed. As another example, the previously-viewed status of different documents may be used to select the storage location to favor the retrieval of new documents over previously-used documents. Furthermore, the popularity of different documents may be used to select the storage location to favor more popular documents over others. Whether or not different documents are sanctioned or specifically not sanctioned, e.g., by a third party, may also be used to select a particular storage location over others.

As yet another example, local user settings may be relied upon to tailor the selection of a specific storage location, e.g., to select a storage location based upon the user's default language or character set, the user's skill level, etc. Still further, the current context at the time the user activates a multi-target link may be used to select a storage location, e.g., to permit different documents to be accessed based upon what other documents have been accessed in the past.

A multi-target link may also be used to sequentially retrieve documents at different storage locations associated with the link, e.g., to permit an author to specify a desired sequence for a user to view multiple documents. A multi-target link may also be used to retrieve data from multiple storage locations at once, thus saving the user the effort of otherwise having to activate multiple links to retrieve data from the multiple storage locations.

Therefore, consistent with one aspect of the invention, data may be accessed from a computer by receiving user input directed to a multi-target link that identifies a plurality of storage locations associated therewith; and accessing data stored at a selected one of the plurality of storage locations. Consistent with another aspect of the invention, a hypertext document may be generated by authoring the hypertext document, and embedding within the hypertext document a multi-target hypertext link definition that identifies a plurality of storage locations associated therewith. Furthermore, consistent with another aspect of the invention, a program product may be provided that includes a hypertext document having embedded therein at least one multi-target hypertext link definition that identifies a plurality of storage locations associated therewith, and a signal bearing media bearing the hypertext document.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

Hardware and Software Environment

Figure 1:
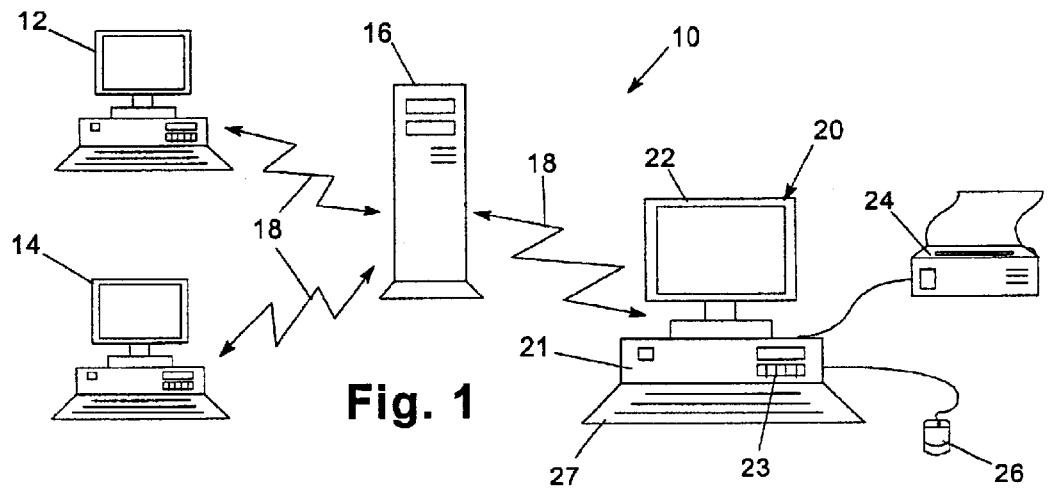
FIG. 1 is a block diagram of a networked computer system consistent with the invention.

Turning to the Drawings, wherein like numbers denote like parts throughout the several views, FIG. 1 illustrates a computer system 10 consistent with the invention. Computer system 10 is illustrated as a networked computer system including one or more client computers 12, 14 and 20 (e.g., desktop or PC-based computers, workstations, etc.) coupled to server 16 (e.g., a PC-based server, a minicomputer, a midrange computer, a mainframe computer, etc.) through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers.

Client computer 20, which may be similar to computers 12, 14, may include a central processing unit (CPU) 21; a number of peripheral components such as a computer display 22; a storage device 23; a printer 24; and various input devices (e.g., a mouse 26 and keyboard 27), among others. Server computer 16 may be similarly configured, albeit typically with greater processing performance and storage capacity, as is well known in the art.

Figure 2:
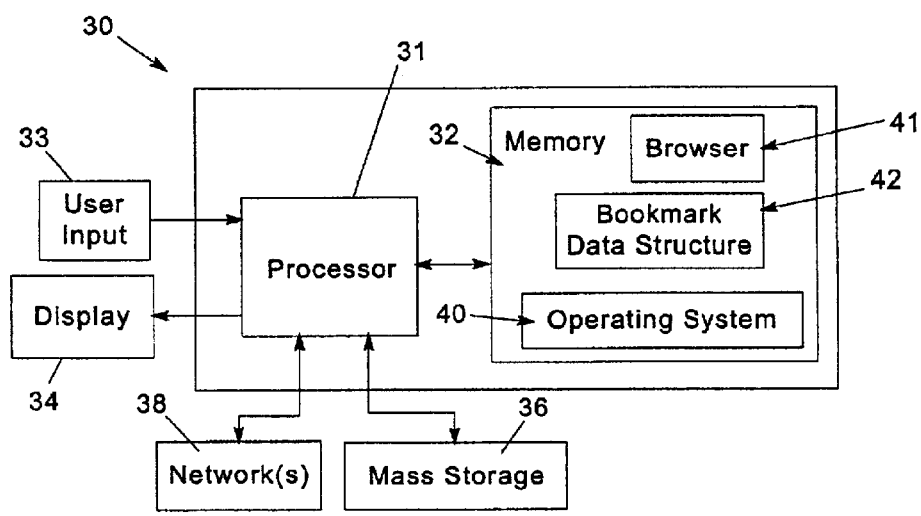
FIG. 2 is a block diagram of an exemplary hardware and software environment for a computer from the networked computer system of FIG. 1.

FIG. 2 illustrates in another way an exemplary hardware and software environment for an apparatus 30 consistent with the invention. For the purposes of the invention, apparatus 30 may represent practically any type of computer, computer system or other programmable electronic device, including a client computer (e.g., similar to computers 12, 14 and 20 of FIG. 1), a server computer (e.g., similar to server 16 of FIG. 1), a portable computer, an embedded controller, etc. Apparatus 30 may be coupled in a network as shown in FIG. 1, or may be a stand-alone device in the alternative. Apparatus 30 will hereinafter also be referred to as a "computer", although it should be appreciated the term "apparatus" may also include other suitable programmable electronic devices consistent with the invention.

Computer 30 typically includes at least one processor 31 coupled to a memory 32. Processor 31 may represent one or more processors (e.g., microprocessors), and memory 32 may represent the random access memory (RAM) devices comprising the main storage of computer 30, as well as any supplemental levels of memory, e.g., cache memories, non-volatile or backup memories (e.g., programmable or flash memories), read-only memories, etc. In addition, memory 32 may be considered to include memory storage physically located elsewhere in computer 30, e.g., any cache memory in a processor 31, as well as any storage capacity used as a virtual memory, e.g., as stored on a mass storage device 36 or on another computer coupled to computer 30 via network 38.

Computer 30 also typically receives a number of inputs and outputs for communicating information externally. For interface with a user or operator, computer 30 typically includes one or more user input devices 33 (e.g., a keyboard, a mouse, a trackball, a joystick, a touchpad, and/or a microphone, among others) and a display 34 (e.g., a CRT monitor, an LCD display panel, and/or a speaker, among others). It should be appreciated, however, that with some implementations of computer 30, e.g., some server implementations, direct user input and output may not be supported by the computer.

For additional storage, computer 30 may also include one or more mass storage devices 36, e.g., a floppy or other removable disk drive, a hard disk drive, a direct access storage device (DASD), an optical drive (e.g., a CD drive, a DVD drive, etc.), and/or a tape drive, among others. Furthermore, computer 30 may include an interface with one or more networks 38 (e.g., a LAN, a WAN, a wireless network, and/or the Internet, among others) to permit the communication of information with other computers coupled to the network. It should be appreciated that computer 30 typically includes suitable analog and/or digital interfaces between processor 31 and each of components 32, 33, 34, 36 and 38 as is well known in the art.

Computer 30 operates under the control of an operating system 40, and executes or otherwise relies upon various computer software applications, components, programs, objects, modules, data structures, etc. (e.g., browser 41 and bookmark data structure 42, among others). Moreover, various applications, components, programs, objects, modules, etc. may also execute on one or more processors in another computer coupled to computer 30 via a network 38, e.g., in a distributed or client-server computing environment, whereby the processing required to implement the functions of a computer program may be allocated to multiple computers over a network.

In general, the routines executed to implement the embodiments of the invention, whether implemented as part of an operating system or a specific application, component, program, object, module or sequence of instructions will be referred to herein as "computer programs", or simply "programs". The computer programs typically comprise one or more instructions that are resident at various times in various memory and storage devices in a computer, and that, when read and executed by one or more processors in a computer, cause that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Those skilled in the art will recognize that the exemplary environments illustrated in FIGS. 1 and 2 are not intended to limit the present invention. Indeed, those skilled in the art will recognize that other alternative hardware and/or software environments may be used without departing from the scope of the invention.

Navigation with Multi-Target Links

The embodiments described herein utilize multi-target links to navigate to one or more of a plurality of available "targets" in response to input received from a user. Each target is typically identified by its storage location, e.g., a Uniform Resource Locator (URL), a filename, a path, and/or other manners of addressing a document in computer system. A document stored at a particular storage location may be considered to include any particular organization of computer data, e.g., hypertext and other documents, computer files, electronic messages, etc., including textual, graphical, video, audio, executable and other types of computer data.

In the illustrated embodiments, multi-target links identify a plurality of URL's representing the targets thereof, with at least some of the documents stored at such URL's being formatted using the Hypertext Markup Language (HTML) protocol. However, it should be appreciated that other data formats and storage locations may be used in the alternative, and thus, the invention should not be limited to the particular implementations discussed herein.

Furthermore, in the illustrated embodiments, multi-target links may be implemented as variations of one or both of embedded hypertext links and bookmarks. When implemented as an embedded hypertext link, a multi-target link is defined by a hypertext link definition embedded in a particular hypertext document, e.g., by the author of the document as the author drafts the document. On the other hand, when implemented as a bookmark (also known as an alias, a shortcut or a favorite), a multi-target link is typically maintained in a custom bookmark list data structure for a particular user. It should be appreciated, however, that in other embodiments, other multi-target link implementations may be used to define multiple navigational targets responsive to a given user input. The term "link" may thus be used hereinafter to generically describe any of the possible implementations of a multi-target link consistent with the invention.

As to the embedded hypertext link implementation, a multi-target link may be implemented, for example, by defining a new tag format specific to multi-target links. On the other hand, given that suitable infrastructure exists within the protocol to support single-target hypertext links, it is envisioned that a multi-target link may be implemented simply by extending the existing HTML protocol to support additional targets. For example, one suitable HTML extension defining a multi-target link is an extension to the "anchor" HTML element as shown below in Table I:

TABLE I

Multi-Target Hypertext Link Definition Format

```
<A
    HTYPE = "[Link_Type]"
    HREF = "[URL 1]"
    HREF = "[URL 2]"
        *
        *
        *
    HREF = "[URL N]"
>
    [displayed text or graphic image for link]
</A>
```

In this implementation, a new field type "HTYPE" is defined to permit an author to define the specific type of multi-target link. Numerous link types may be defined as detailed below, including for example "ROBUST", "FAST", "FRESH", etc. Moreover, a separate HTYPE field may not be required in certain implementations, e.g., if only one type is supported, or if the type can be ascertained via other information in the document or via an external source such as a browser configuration setting. Furthermore, in some implementations, it may be desirable to permit the other information in a document or from an external source (e.g., a browser configuration setting) to override the link type supplied in the HTYPE field.

Moreover, to define more than one target, the HTML extension simply permits the use of multiple instances of the conventional "HREF" field in any given tag. Moreover, it may be desirable in certain implementations to extend this field to provide additional information about each target, e.g., to supply ordering information, to supply information about the target for use in selecting one of the targets (e.g., a chronological condition, a context condition, a document version, a document language, a document character set, or other data specific to any of the link types detailed below), etc. As an alternative to supplying ordering information, the order of the targets may also be implied from the ordering thereof in the tag.

Other HTML extensions suitable for supporting the various multi-target link implementations discussed herein will be apparent to one of ordinary skill in the art.

Figure 3:
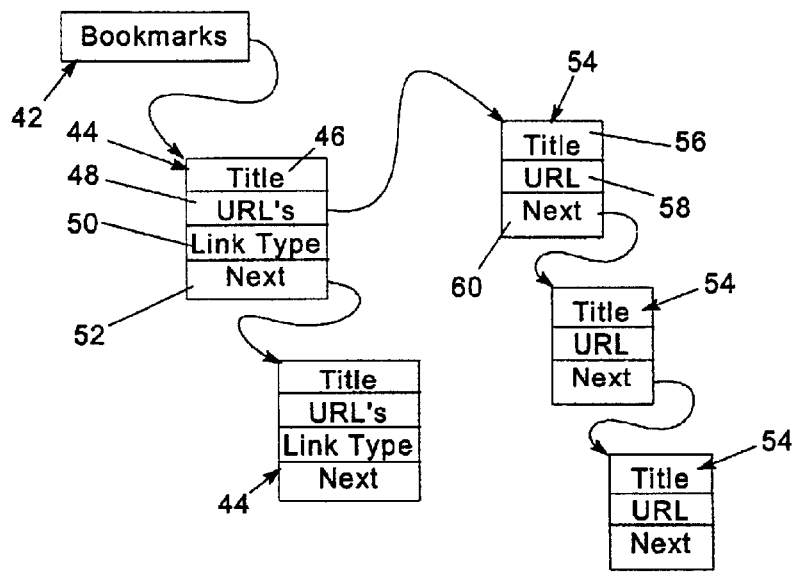
FIG. 3 is a block diagram of the bookmark data structure of FIG. 2.

As to a bookmark implementation of a multi-target link, FIG. 3 illustrates bookmark data structure 42 in greater detail, including a linked list of bookmark records 44, each with a series of fields 46, 48, 50 and 52. Field 46 of each bookmark record 44 defines a title for the bookmark, which is typically displayed to a user when viewing the bookmark list. Field 48 stores a pointer to a linked list of URL records 54 defining the multiple targets for the bookmark. Optional field 50 defines a link type for the multi-target link, if necessary, and field 52 stores a pointer to the next bookmark record 44 in the data structure. Field 52 of the last such bookmark record in the data structure typically stores a NULL pointer.

Each URL record 54 includes an optional title field 56 defining a title for the target to display to a user when viewing the list of targets for a particular bookmark. A field 58 supplies the URL for the target, and a next field 60 stores a pointer to the next URL record 54 in the linked list, with the next field of the last record in the list storing a NULL pointer.

It should be appreciated that additional information necessary for implementing any of the various link types described hereinafter may also be stored in data structure 42, as may other information conventionally stored in some bookmarks. Furthermore, it should be appreciated that data structure 42 may also support conventional single-target links, simply by including only one URL record 54 for a given bookmark record, and by storing a NULL or SINGLE link type in the link type field. Moreover, other data structures may be used to organize any of the bookmark and multi-target link information described herein. In addition, it should be appreciated that a data structure similar to data structure 42 may also be used to store the embedded hypertext link definitions for a given hypertext document, e.g., in a dynamic data structure that is updated any time a new document is retrieved into a browser.

Figure 4:
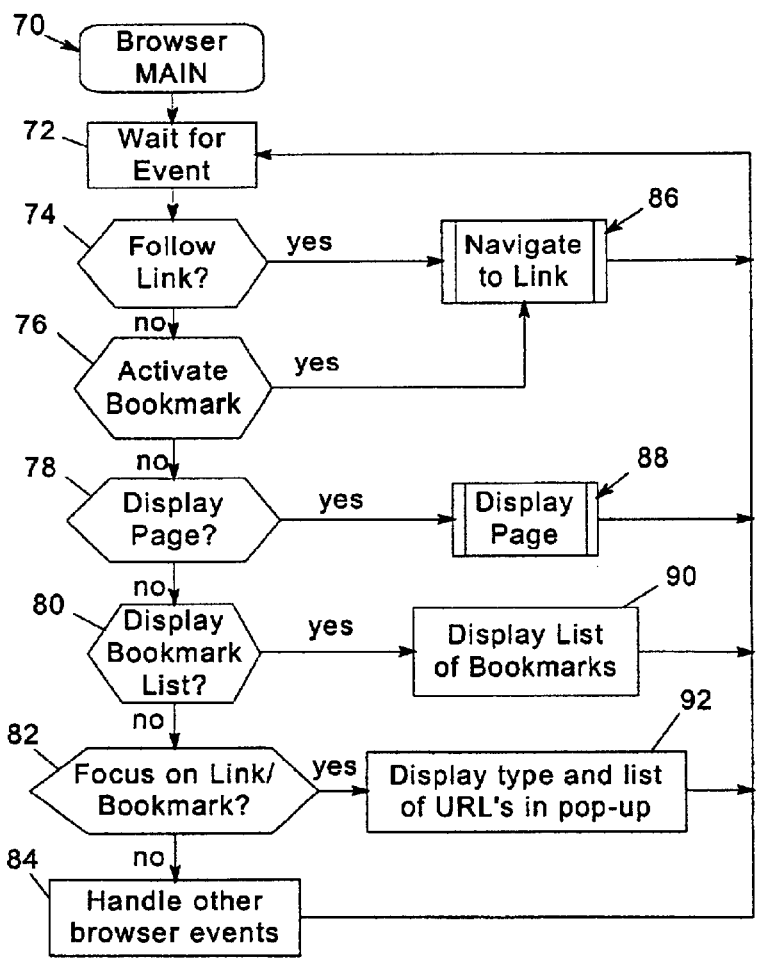
FIG. 4 is a flowchart illustrating the program flow of a main routine for the browser of FIG. 2.

To illustrate the different link types that may be implemented in a browser consistent with the invention, FIG. 4 illustrates a main routine 70 for browser 41. Routine 70 illustrates an event-driven implementation, where browser 41 waits for events at block 72, then attempts to detect and handle various events at blocks 72, 74, 76, 78, 80, 82 and 84. The events detected at blocks 72-82 detail the implementation of multi-target links consistent with the invention. However, it should be appreciated that a multitude of additional events, an understanding of which is not important to an understanding of the invention, may also be detected and handled by browser 41, as represented by block 84. It should also be appreciated that other programming implementations, e.g., object-oriented or procedural models, may also be used in the alternative.

One relevant event handled by routine 70 is a follow link event, which is detected at block 74 and handled by a navigate to link routine 86. A follow link event is typically generated in response to a user directing input to the display representation of a hypertext link definition displayed in a browser, e.g., by the user depressing a mouse button while the mouse pointer is located over the display representation of the hypertext link.

Another relevant event handled by routine 70 is an activate bookmark event, which is detected at block 76 and also handled by navigate to link routine 86. An activate bookmark event is typically generated in response to a user selecting a bookmark from a currently-displayed bookmark list. To facilitate an explanation of the illustrated embodiment, navigate to link routine 86 is described as generic to both hypertext links and bookmarks; however, it will be appreciated that separate routines may be used in other implementations.

An additional event handled by routine 70 is a display page event, which is detected at block 78 and handled by a display page routine 88. This event is generated to display a display representation of a hypertext document retrieved by the browser, and is described in greater detail below with reference to FIG. 22.

Another event handled by routine 70 is a display bookmark list event, which is detected at block 80 and handled by block 90, where the list of bookmarks is displayed to the user, e.g., in a conventional manner. Yet another event is a focus on link/bookmark event, which is detected in block 82 and handled by block 92, e.g., in response to a user positioning the mouse pointer over a display representation of a hypertext link or bookmark. Block 92 may be configured, for example, to display a pop-up window adjacent the pointer that indicates the type and list of URL's for the link associated with the hypertext link or bookmark.

Figure 5:
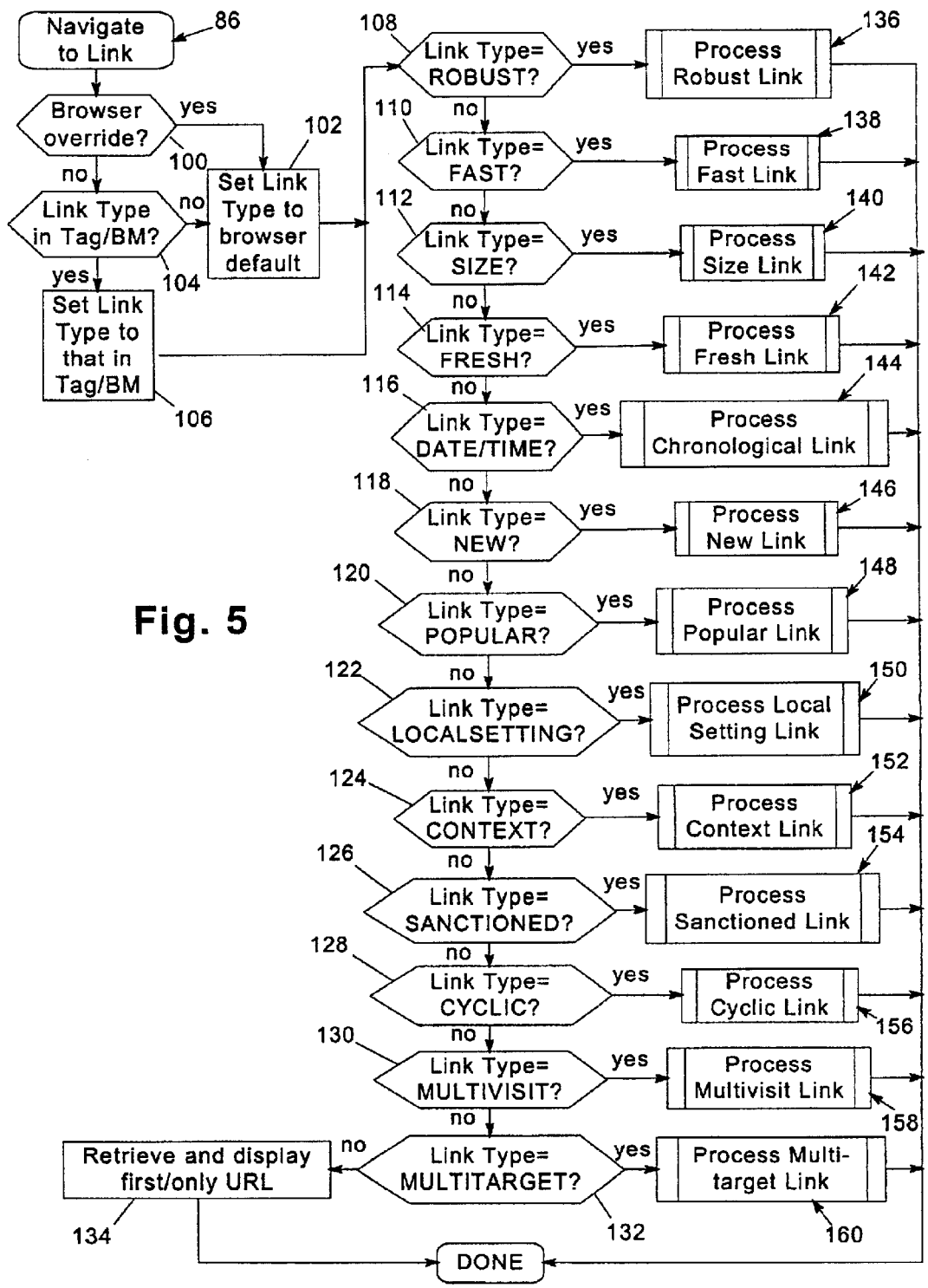
FIG. 5 is a flowchart illustrating the program flow of the navigate to link routine of FIG. 4.

Navigate to link routine 86 is illustrated in greater detail in FIG. 5. Routine 86 basically operates by calling one of a plurality of subroutines based upon the particular type of link activated by a user. As discussed above, the link type of a particular link may be determined from several sources, e.g., from a user's local browser settings, or from the bookmark/hypertext link definition for the link, among others. Thus, routine 86 begins in block 100 by determining first if a browser override setting is enabled, whereby if enabled the browser default link type is automatically selected irrespective of any link type defined in the link by passing control to block 102. If the override setting is not enabled, control passes to block 104 to determine whether a link type is specified in the link itself. If not, control passes to block 102 to select the browser default. If a link type is specified, however, that link type is selected by passing control to block 106.

Once the link type is selected, control passes from either of blocks 102, 106 to a series of decision blocks 108–132, each of which detects a specific link type and passes control to a dedicated handling routine. If no such link types are detected, a default block 134 is executed to retrieve and display the first (if a multi-target link) or only (if a single-target link) URL for the link, in a manner well recognized in the art.

Block 108 detects a "ROBUST" link type, passing control to a process robust link routine 136, and block 110 detects a "FAST" link type, passing control to a process fast link routine 138. Block 112 detects a "SIZE" link type, passing control to a process size link routine 140. Block 114 detects a "FRESH" type, passing control to a process fresh link routine 142. Block 116 detects a "CHRONOLOGICAL" link type, passing control to a process chronological link routine 144. Block 118 detects a "NEW" link type, passing control to a process new link routine 146. Block 120 detects a "POPULAR" link type, passing control to a process popular link routine 148. Block 122 detects a "LOCAL SETTING" link type, passing control to a process local setting link routine 150. Block 124 detects a "CONTEXT" link type, passing control to a process context link routine 152. Block 126 detects a "SANCTIONED" link type, passing control to a process sanctioned link routine 154. Block 128 detects a "CYCLIC" link type, passing control to a process cyclic link routine 156. Block 130 detects a "MULTIVISIT" link type, passing control to a process multivisit link routine 158. Block 132 detects a "MULTILAUNCH" link type, passing control to a process multilaunch link routine 160.

It should be appreciated that not all possible link types may be supported in any given implementation. Moreover, other types of multi-target links may also be supported in other implementations.

In general, there are two primary places that can control how a link is interpreted. First, information embedded within a multi-target link may be utilized to control how the link is interpreted. Also, a local setting on the browser may be utilized to control how a link is interpreted. Furthermore, it should be appreciated that various methodologies might be combined and utilized concurrently. For example, it may be desirable to utilize a new link methodology to first remove URL's that have already been visited, and then utilize a robust link methodology to select a first one of the remaining links to view. Other modifications will be apparent to one of ordinary skill in the art.

A discussion of each enumerated link type follows below.

Robust Link

Figure 6:
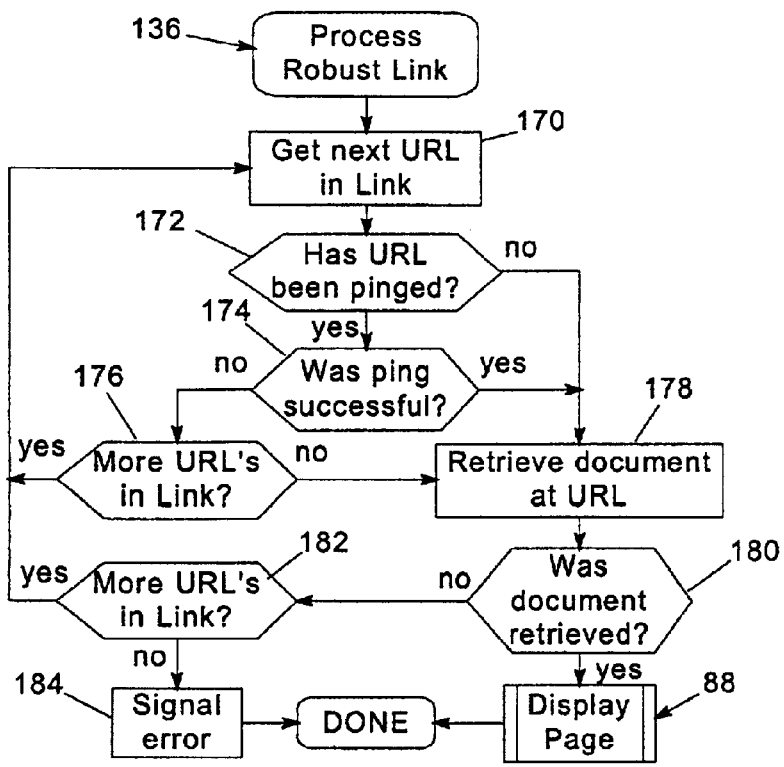
FIG. 6 is a flowchart illustrating the program flow of the process robust link routine of FIG. 5.

Process robust link routine 136 is illustrated in greater detail in FIG. 6. A robust link type defines a type of link where the multiple targets of the link are arranged hierarchically, with a primary target being accessed if possible, and with alternate targets accessed if attempts to access the primary target were unsuccessful. Thus, if the server of the URL identified by a target cannot be pinged or the document cannot be retrieved, the browser moves on to the next link in the list. Often, this type of link may be used to minimize the occurrence of a "URL not found" message from the browser, e.g., by providing alternate targets from which a given document may be retrieved.

Routine 136 begins in block 170 by getting the next URL in the link. With the first iteration through the routine, the first URL specified in the link is thus selected. Next, block 172 determines whether the URL has yet been "pinged" by the browser. In this implementation, a separate "ping" thread is executed by the browser in the background to test each of the targets specified for the various links defined on a currently-displayed hypertext document. A "ping" operation is a well known networking operation to send a test request to the server for a particular storage location and receive back a response therefrom. Moreover, in other implementations it may not be desirable to utilize a separate "ping" thread, whereby routine 136 would be required to test each target in sequence.

Assuming first that the URL has been "pinged", control passes to block 174 to determine whether the "ping" was successful—that is, whether a response was returned by the server for the URL identified at that target. If the "ping" was not successful, indicating that the browser was unable to receive a response, control passes to block 176 to query whether more URL's exist in the link. If so, control returns to block 170 to process the next URL in the link.

Returning to block 174, if the "ping" was successful, control passes to block 178 to retrieve the document stored at the URL. In addition, as noted at block 172, if the URL has not been "pinged", control may pass directly to block 178 to attempt to retrieve the document at the URL. Moreover, as shown at block 176, if no successfully "pinged" URL was located, and no additional URL's remain to be processed, block 176 passes control to block 178 to attempt to retrieve the last document in the link.

Block 178 next passes control to block 180 to determine whether the document was successfully retrieved. If so, control passes to display page routine 88 to render and display the document to the user, whereby routine 136 is complete. If, however, the document was not successfully retrieved, control passes to block 182 to determine whether additional URL's remain to be processed in the link. If so, control returns to block 170 to process the additional URL's. If, however, no additional URL's exist in the link, an error is returned in block 184, and routine 136 is complete. The error indicates to the user that none of the URL's specified in the link could be retrieved.

It should be appreciated that each URL may have associated therewith a ranking so that the URL's may be tested hierarchically by routine 136. In the alternative, it may be desirable to define the hierarchy of URL's for a link merely by the arrangement of such URL's in the data structure for the link.

Figure 7:
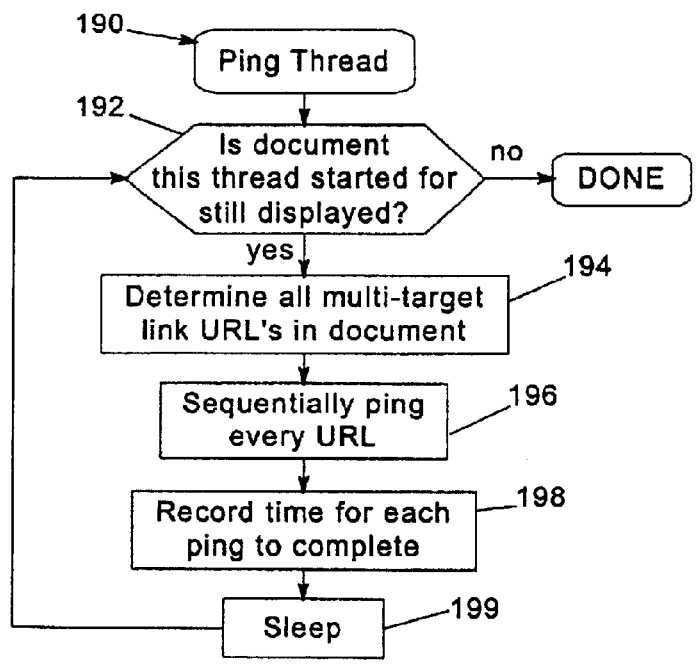
FIG. 7 is a flowchart illustrating the program flow of a ping thread consistent with the invention.

FIG. 7 illustrates a "ping" thread 190 utilized to test the various targets specified for a given hypertext document currently displayed to a user. Routine 190 begins in block 192 by determining whether the document for which this thread was started is still displayed by the browser. If so, control passes to block 194 to determine all multi-target link URL's in the document. In addition, within this block it may be desirable to reset any indicators or flags indicating that indicate that any of such URL's have been pinged. Next, in block 196, each URL (or simply the portion of each URL that identifies the server for that URL—e.g., the domain name) is sequentially "pinged" by the browser. Moreover, after each URL is pinged, a flag or other indicator is set to indicate that the URL has been pinged.

Next, in block 198, the time for each "ping" to complete—that is, the time to receive a response from the server for the URL—is recorded. Next, in block 199, "ping" thread 190 enters a sleep state for a predetermined time. Control then returns to block 192 to re-analyze each target if the document is still displayed to the user. Once a new document is displayed, block 192 terminates "ping" thread 190.

Recording the time for each "ping" to complete is utilized by certain implementations of the fast link type, and may be omitted if such type is not supported.

Fast Link

Figure 8:
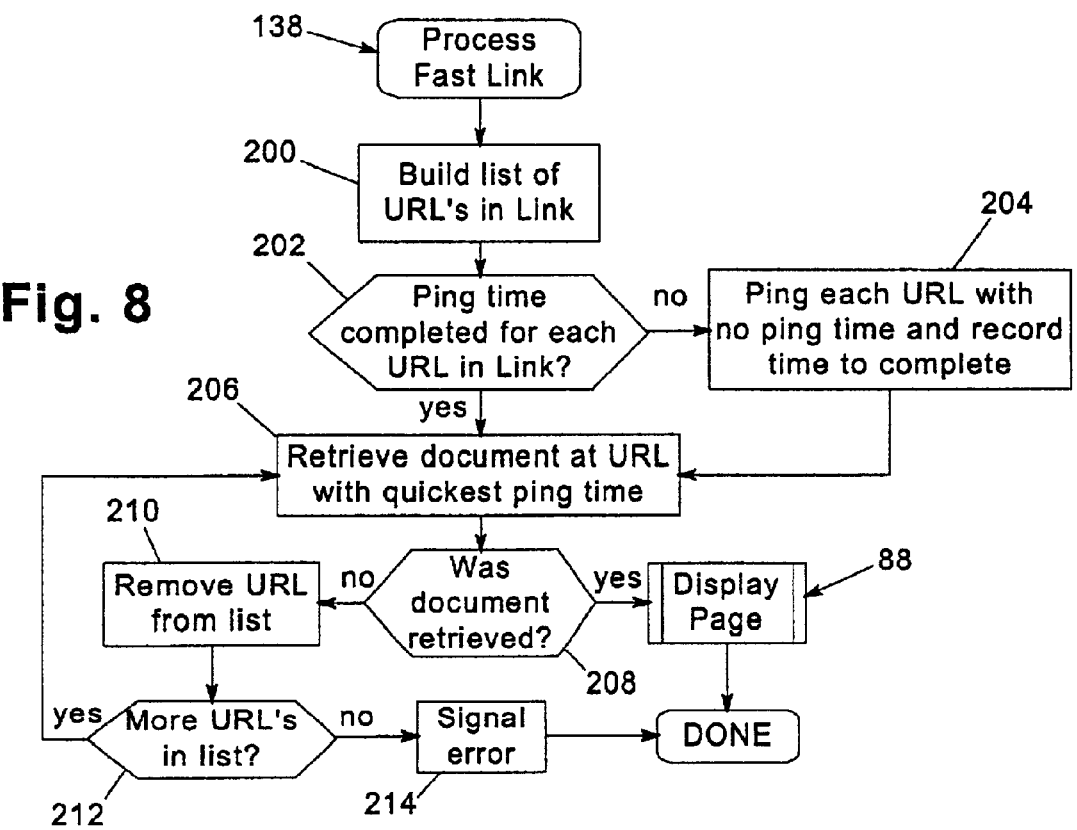
FIG. 8 is a flowchart illustrating the program flow of the process fast link routine of FIG. 5.

FIG. 8 illustrates process fast link routine 138 in greater detail. The fast link type is similar in many respects to the robust link type, except that, rather than retrieving alternate documents only if a primary document is not available, the fast link type attempts to determine which of a plurality of targets offers the optimum performance for the user. Determination of which of a plurality of targets offers the best performance may be made in several manners. For example, as illustrated by routine 138, the best performance may be determined by comparing the response times associated with each of a plurality of targets.

In particular, routine 138 begins at block 200 by building a list of URL's in the link. Next, block 202 determines whether a "ping" time has been calculated for each URL in the link, e.g., by a background "ping" thread as described above. If not, control passes to block 204 to "ping" each URL having no "ping" time recorded therefor, and record the time to complete each "ping". Control then passes to block 206 to retrieve the document stored at the URL having the quickest "ping" time. In addition, returning to block 202, if a "ping" time has been completed for each URL, control passes directly to block 206.

Block 206 next passes control to block 208 to determine whether the document was successfully retrieved. If so, control passes to display page routine 88, whereby routine 138 is complete. If, however, the document was not successfully retrieved, control passes to block 210 to remove the unsuccessful URL from the list, and then to block 212 to determine whether additional URL's remain in the list. If so, control returns to block 206 to retrieve the next-quickest URL. If, however, no additional URL's remain in the list, control passes to block 214 to signal an error that no document was successfully retrieved. Routine 138 is then complete.

The target having the highest performance for a user may also be determined in other manners consistent with the invention. For example, rather than utilizing the response time, a sample transfer rate may be calculated, e.g., by retrieving a portion of the data stored at each target and calculating the transfer rate therefor. It is anticipated that such a calculation may be superior to calculating the response time for relatively larger downloads, e.g., when downloading large applications from the Internet. The use of such a link would, for example, permit a document author to provide one link that a user may select to download a given application, with multiple mirror sites associated with the link such that the fastest mirror site for downloading the application could be selected.

Size Link

Figure 9:
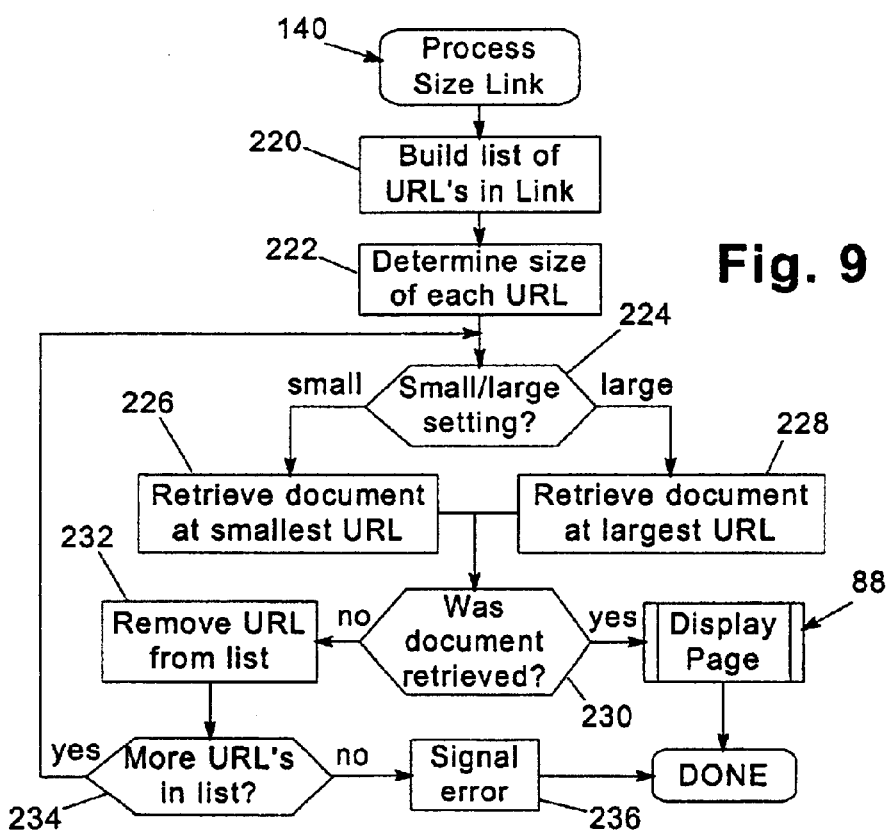
FIG. 9 is a flowchart illustrating the program flow of the process size link routine of FIG. 5.
Figure 10:
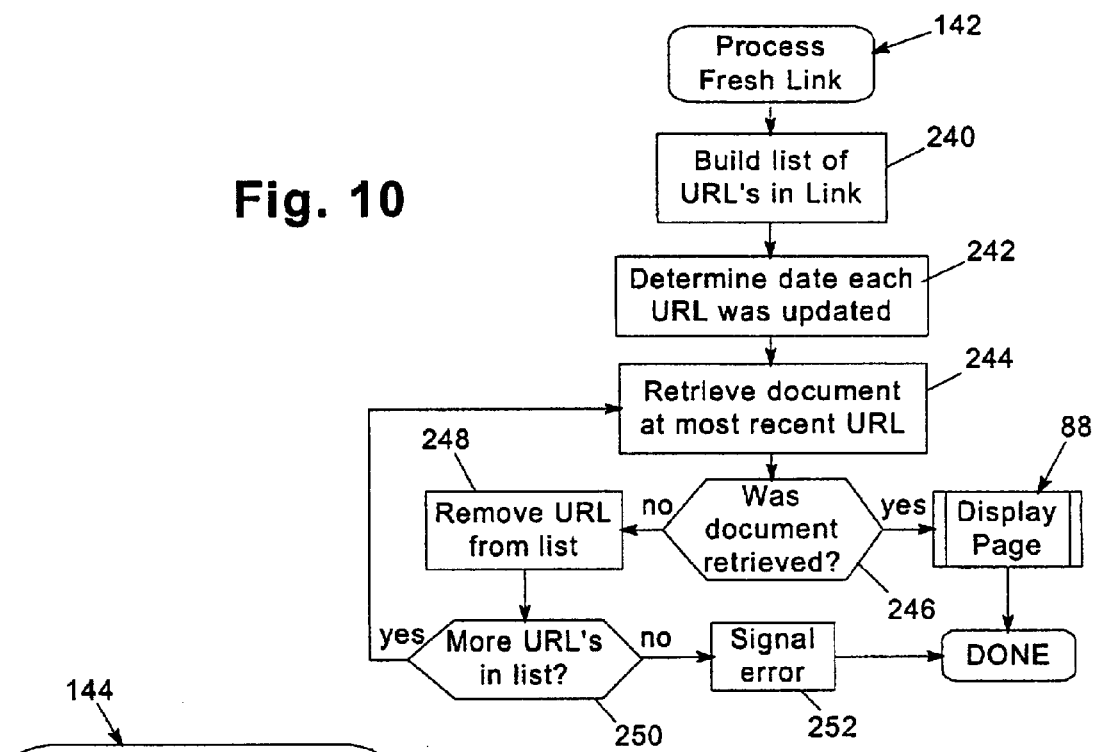
FIG. 10 is a flowchart illustrating the program flow of the process fresh link routine of FIG. 5.

Process size link routine 140 is illustrated in greater detail in FIG. 9. The size link type may be considered in some respects to be a variation of the fast link type, given that the response time for downloading a document will vary depending upon the size of that document. However, in other settings it may be desirable for a user to request the largest document among a plurality of alternatives. Thus, routine 140 permits a user to request either the smallest or largest among a plurality of documents, e.g., by a local browser setting, or via dedicated inputs specified at the time that the link is selected (e.g., via a pop-up menu or dialog box, among others).

Routine 140 begins in block 220 by building a list of URL's in the link. Next, block 222 determines the size of the document stored at each URL, e.g., by requesting such information from the server for that URL, or in other manners known in the art. Next, block 224 determines whether the small or large setting has been requested by the user. If a small setting is requested, control passes to block 226 to retrieve the document at the smallest URL. On the other hand, if the large setting is requested, block 228 is executed to retrieve the document at the largest URL. Regardless of the setting, control next passes to block 230 to determine whether the document was successfully retrieved. If so, the display page routine 88 is called, whereby routine 140 is complete. If not, however, control passes to block 232 to remove the URL from the list. Next, block 234 determines whether additional URL's remain in the list to be processed. If so, control returns to block 224. If not, however, an error is signaled in block 236, and routine 140 is complete.

In addition to the determination of the optimum performance, other uses may be envisioned for a size link type. For example, the size of documents could be utilized to make an automated image/text-version selection, or to automatically select between JAVA or scripted versions of a document versus non-JAVA or non-scripted versions thereof. Other uses will become apparent to one of ordinary skill in the art.

Fresh Link

Process fresh link routine 142 is illustrated in greater detail in FIG. 11O. This type of link looks at the relative ages of various targets of a link and returns the most recent document to the user. In the alternative, an oldest document could be returned.

Routine 142 begins in block 240 by building a list of URL's in the link. Next, in block 242, the date that each URL was updated is determined. This may be performed, for example, by retrieving a time stamp for each URL, or by analyzing the text in the document to determine a time stamp therefor.

Next, block 244 retrieves the document at the most recent URL, and block 246 then determines whether the document retrieval was successful. If so, display page routine 88 is called and routine 142 is complete. If, however, the document retrieval was not successful, control passes to block 248 to remove the URL from the list, and then to block 250 to determine whether additional URL's remain in the list. If so, control passes back to block 244 to retrieve the next most recent URL. However, if all URL's have been removed from the list, control passes to block 252 to signal an error, whereby routine 142 is then complete.

It should be appreciated that the date in which each URL was updated may also be performed in the background as with the "ping" thread, rather than being performed in routine 142.

Chronological Link

Figure 11:
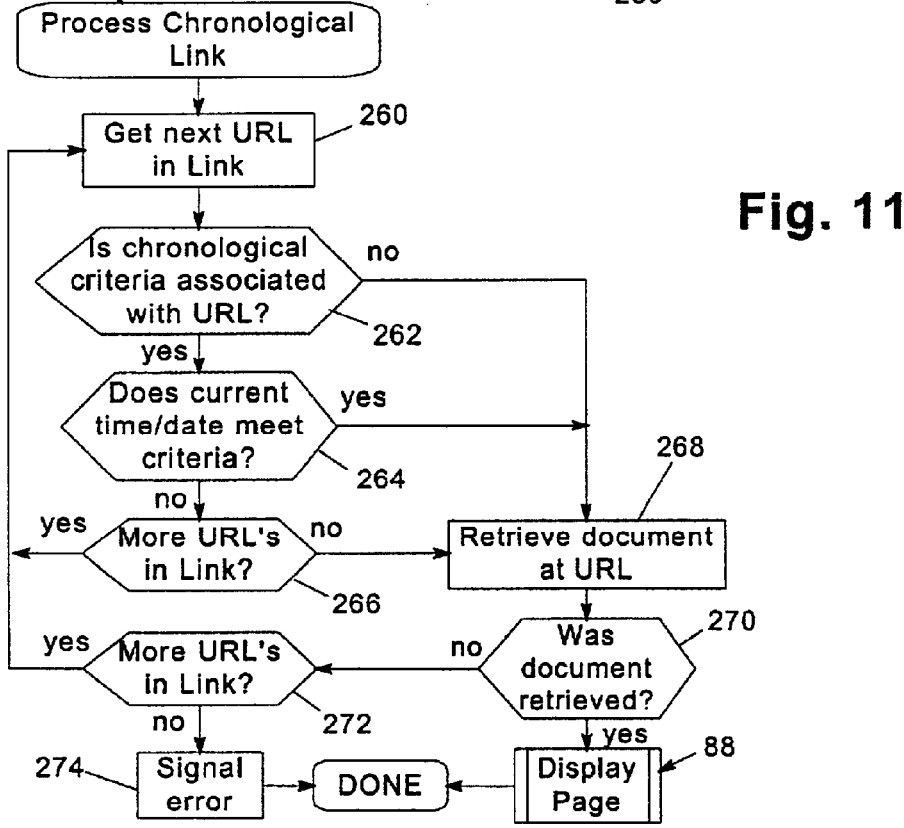
FIG. 11 is a flowchart illustrating the program flow of the process chronological link routine of FIG. 5.

FIG. 11 illustrates process chronological link routine 144 in greater detail. A chronological link has associated with at least one of the targets therefor a chronological criteria defining when in time a particular document should be selected for retrieval in response to selection of the link. The time compared to the chronological criteria for one or more targets may be the current time of day, or in the alternative, may be based upon when a particular document was updated. Moreover, time or date limitations may be present independent of the other.

To implement a chronological link, typically one or more of the targets therefor must have associated therewith a chronological criteria. For a bookmark implementation, this type of link may require an additional field in each URL record specifying the chronological criteria that must be met prior to selecting the target. For a hypertext link implementation, such information may be embedded within a tag, e.g., as an additional field. Each target for a multi-target link may have associated therewith a chronological criteria, or in the alternative, one or more targets may have no chronological criteria associated therewith, whereby one or more of such targets would function as a default target.

Routine 144 beings in block 260 by retrieving the next URL from the link, starting with the first URL therefor. Next, in block 262, it is determined whether a chronological criteria is associated with the URL. If so, control passes to block 264 to determine whether the current time and/or date meet the criteria for the URL. In an alternate embodiment, if the update time of a document is compared with a chronological criteria, block 264 would be replaced by a retrieval of the update information for the URL, followed by comparing such update information with the predetermined criteria.

If the condition in block 264 is not met, control is passed to block 266 to determine whether additional URL's exist in the link for processing. If so, control returns to block 260 to process such additional URL's.

Returning to block 264, if the current time and/or date meets the criteria, control passes to block 268 to retrieve the document stored at the URL. In addition, returning to block 262, if no chronological criteria is associated with the URL, control passes directly to block 268. Furthermore, if the condition in block 264 is met, but no more additional URL's remain to be processed in the link, block 266 passes control to block 268 to retrieve as a default the document stored at the last URL in the link.

Upon retrieval of the document stored at the URL, control passes to block 270 to determine whether the document retrieval was successful. If so, display page routine 88 is called, and routine 144 is complete. If, however, the document was not retrieved, control passes to block 272 to determine whether more URL's exist in the link. If so, control passes to block 260 to process the additional links. If not, however, block 274 signals an error to the user, and routine 144 terminates.

Among other possible uses for this type of link, one particularly beneficial use would be to specify that different documents are retrieved at different times of the day. For example, a stock market multi-target link could have a first target to a current market status document, with a second target associated with a market recap or summary document. During hours in which the stock market is open, the chronological criteria could dictate that selection of the link would result in retrieval of the current market status, whereas if the market was closed, a market recap document would be retrieved instead.

New Link

Figure 12:
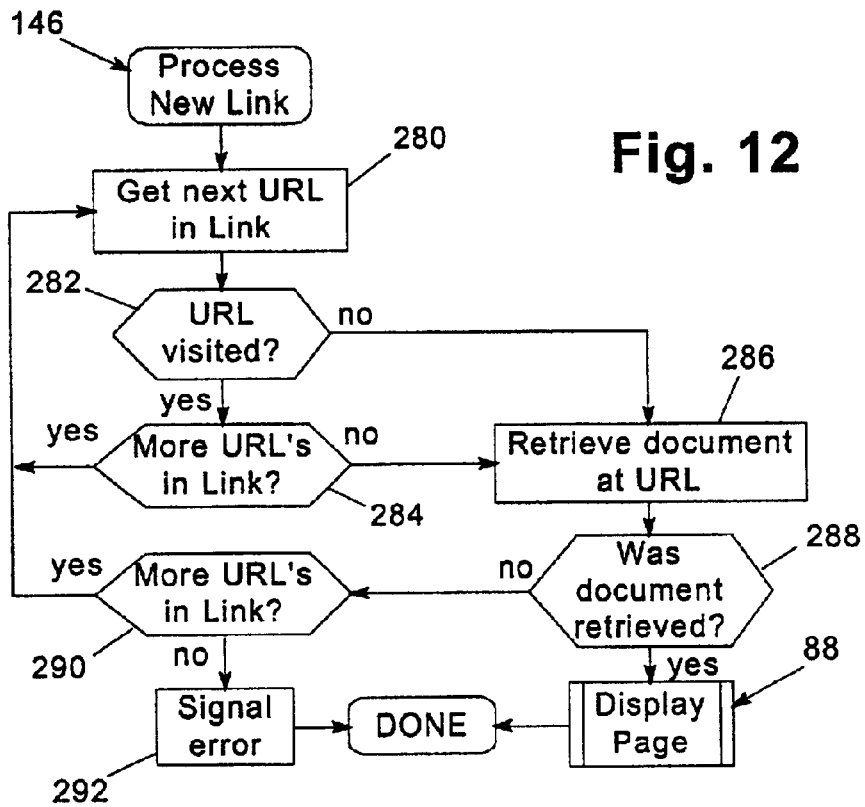
FIG. 12 is a flowchart illustrating the program flow of the process new link routine of FIG. 5.

Process new link routine 146 is illustrated in greater detail in FIG. 12. A new link is typically used to favor non-visited links over other links which have been previously viewed during a current or previous browsing session. Any number of manners may be utilized to determine whether a link has been previously viewed. For example, a local history cache for the browser may be search to determine if a particular target is stored in the cache. In the alternative, it may be assumed that a document has been previously viewed if a URL associated therewith is stored in the bookmark list. Other manners of determining whether a document has been previously used may be used in the alternative.

Routine 146 begins in block 280 by getting the next URL in the link, starting with the first. Next, block 282 determines whether the URL has been previously visited, e.g., by searching the history cache for the browser. If the URL has been previously visited, control passes to block 284 to determine whether additional URL's remain in the link for processing. If so, control returns to block 280. If the URL was visited, or if no additional URL's remain in the link, blocks 282 and 284 pass control to block 286 to retrieve the document stored at the current URL. Next, block 288 determines whether the document retrieval was successful. If so, display page routine 88 is called, and routine 146 is complete. If not, however, block 290 determines whether additional URL's remain in the link for processing. If so, control returns to block 280. If not, control passes to block 292 to signal an error, whereby routine 146 terminates.

Popular Link

Figure 13:
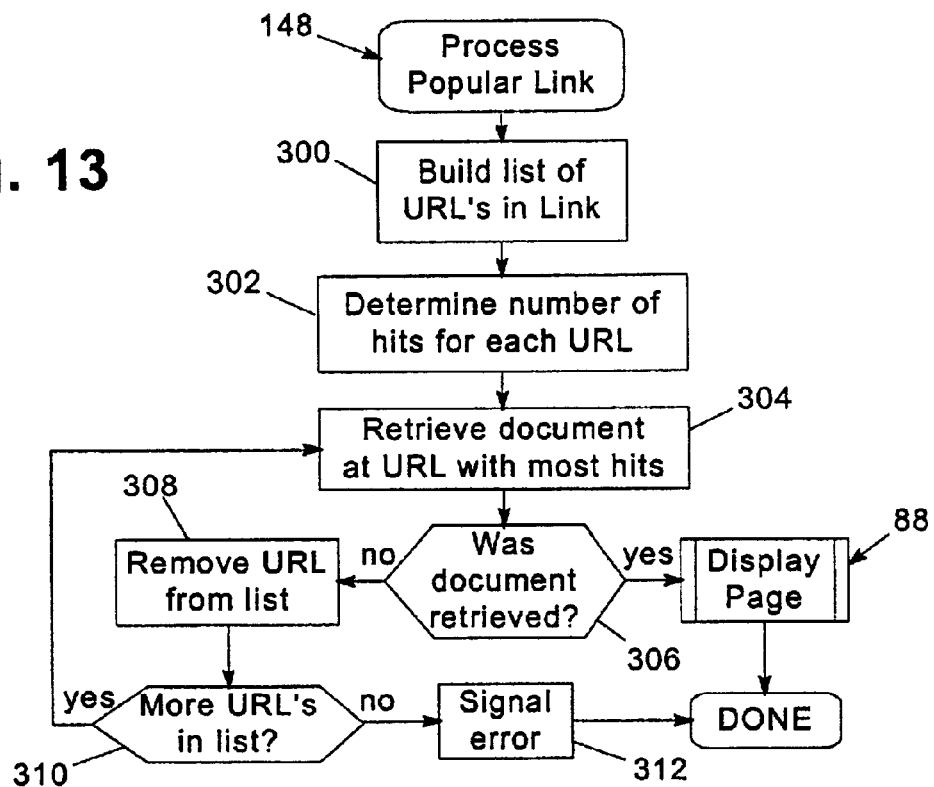
FIG. 13 is a flowchart illustrating the program flow of the process popular link routine of FIG. 5.

Process popular link routine 148 is illustrated in greater detail in FIG. 13. A popular link is typically determined by examining a relative number of "hits" for various targets for a given link. The number of "hits" is the number of times that the document has been retrieved by multiple users having access to a web site. Typically, this may be performed by scanning each document for a counter. In the alternative, a server could be configured to track and return such information for any document in response to a specific request therefor.

Routine 148 begins in block 300 by building a list of URL's in the link. Next, block 302 determines the number of "hits" for each URL, in any of the manners discussed above. Next, block 304 retrieves the document at the URL having the most "hits". Next, block 306 determines whether the document retrieval was successful. If so, display page routine 88 is called, and routine 148 is complete. If, however, the document retrieval was unsuccessful, control passes to block 308 to remove the URL from the list, and then to block 310 to determine whether more URL's exist in the list. If so, control passes to block 304 to process the additional URL'S. If not, an error is signaled to the user in block 312, and routine 148 terminates.

Local Setting Link

Figure 14:
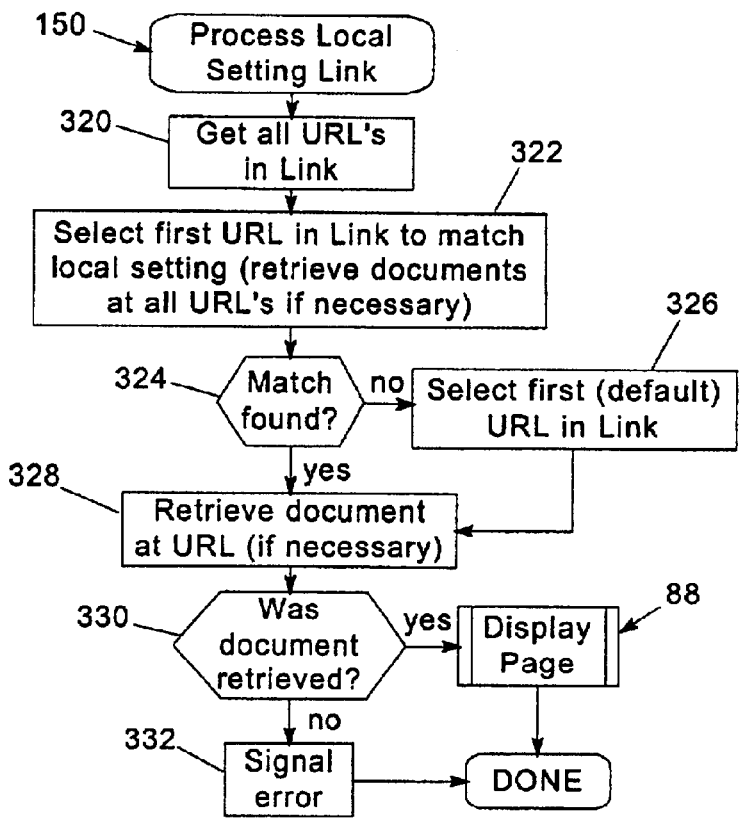
FIG. 14 is a flowchart illustrating the program flow of the process local settings link routine of FIG. 5.

Process local setting link routine 150 is illustrated in greater detail in FIG. 14. A local setting link represents a class of link types wherein a particular setting for the browser, whether or not configurable by a user, is used to determine which of a plurality of targets is retrieved. Routine 150 begins at block 320 by retrieving all URL's in the link, and then in block 322 by selecting the first URL in the link to match a particular local setting. Block 322 may also require that the documents at each URL be retrieved for the purpose of comparing with the local setting.

Next, in block 324, it is determined whether a match is found. If not, the first URL in the link is selected by default in block 326. If a match is found, or upon completion of block 326, block 328 is executed to retrieve the document stored at the URL, if the document was not already retrieved in block 322. Next, block 330 determines whether the document retrieval was successful. If so, display page routine 88 is called and routine 150 is complete. If the retrieval was not successful, however, control passes to block 332 to signal an error and terminate the routine.

Any number and combination of local settings may be utilized to select among a plurality of targets consistent with the invention. For example, a local setting may be a default language that indicates the language of a document. As such, either a language identifier for the document, or various keywords in the document, may be searched to determine which of a plurality of targets matches the desired language. This would enable a single hypertext link to be utilized to retrieve different language documents for different users based upon the settings therefor.

In a similar vein, a local setting may include a character set, e.g., a coded character set identifier (CCSID). In addition to being an alternate manner of determining the preferred language of a document, the CCSID may be utilized to select URL's of the same code page as the browser so that no conversion needs to be done by the browser, among other uses.

In addition, a local setting may be based upon a desired default version of a hypertext document. For example, various version types may be used, e.g., text-only versions, graphics versions, JAVA-enabled versions, non-JAVA version, scripted versions, non-scripted versions, etc. These settings may be configurable by a user, or may represent the inherent capabilities of a particular browser. Thus, if a particular browser was incapable of supporting a particular technology, an alternate document could be retrieved in its stead. Among other local settings that may be utilized to select different documents, a user skill level or other interest could be utilized to select among different documents. For example, a user may select among a "beginner" and an "advanced" user setting, whereby documents tailored to different user skill levels could be retrieved for different users.

It may be seen that a wide variety of alternate local settings may be utilized in the alternative. Moreover, it should be appreciated that multiple user settings may also be used concurrently to select among various targets.

Context Link

Figure 15:
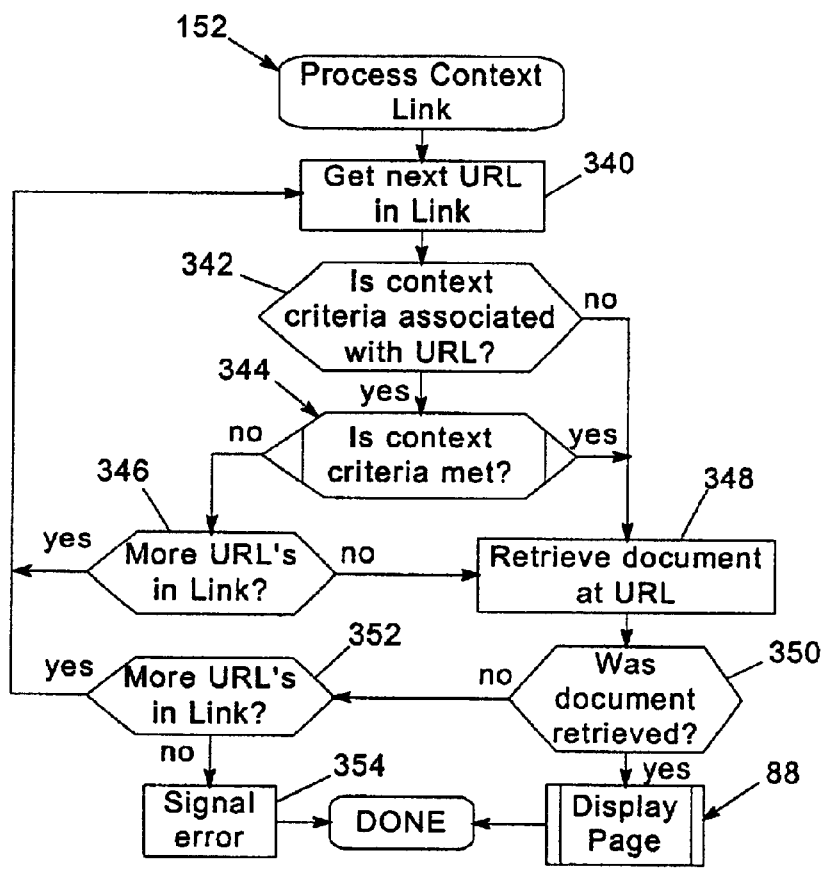
FIG. 15 is a flowchart illustrating the program flow of the process context link routine of FIG. 5.

FIG. 15 illustrates process context link routine 152 in greater detail. A context link, also referred to as a tailored link, may use context information associated with the hypertext link definition or bookmark data structure to determine which among a plurality of targets to activate based upon a user's previous navigational history. In the illustrated embodiment, for example, the previously-viewed status of a plurality of hypertext links for a currently-viewed hypertext document may be compared versus a context criteria associated with each target to determine which of a plurality of targets to activate in response to user selection of the multi-target link. In the alternative, the previously viewed status of other documents, not necessarily the targets of particular links in a currently-viewed document, may be used. The benefit of such a link is that a document designer can make sure that a user seeks particular information needed to understand other concepts in no matter what order links are selected.

Routine 152 begins in block 340 by getting the next URL in the link, starting with the first such URL. Next, block 342 determines whether a context criteria is associated with the URL. If so, an "is context criteria met?" routine 344 is executed to determine whether the context criteria associated with the URL has been met. If routine 344 returns NO, control passes to block 346 to determine whether more URL's remain to be processed in the link. If so, control returns to block 340 to process such URL's.

If routine 344 returns a YES value, however, control passes to block 348 to retrieve the document at the current URL. In addition, returning to block 342, if no context criteria is associated with a given URL, control passes directly to block 348. Moreover, if the context criteria is not met, but no more additional URL's remain in the link, block 346 passes control to block 348 to retrieve the last URL as a default. Upon retrieval of the document stored at the current URL, control passes to block 350 to determine whether the document retrieval was successful. If so, display page routine 88 is called, and routine 152 is complete. If, however, the retrieval was unsuccessful, control passes to block 352 to determine whether additional URL's remain in the link. If so, control returns to block 340. If not, an error is signaled to the user in block 354, and routine 152 terminates.

Various context criteria may be associated with different targets for a multi-target link. As but one example, one or more targets for a link may have associated therewith one or more context URL's that the user must visit before or visit after, in relation to retrieval of the associated target. If a user must retrieve a particular target before visiting a context URL, the target should not be selected if the context URL has already been visited. In contrast, if the target should not be visited until after a context URL has been visited, an attempt to retrieve the target prior to visiting the context URL should not be permitted.

Figure 16:
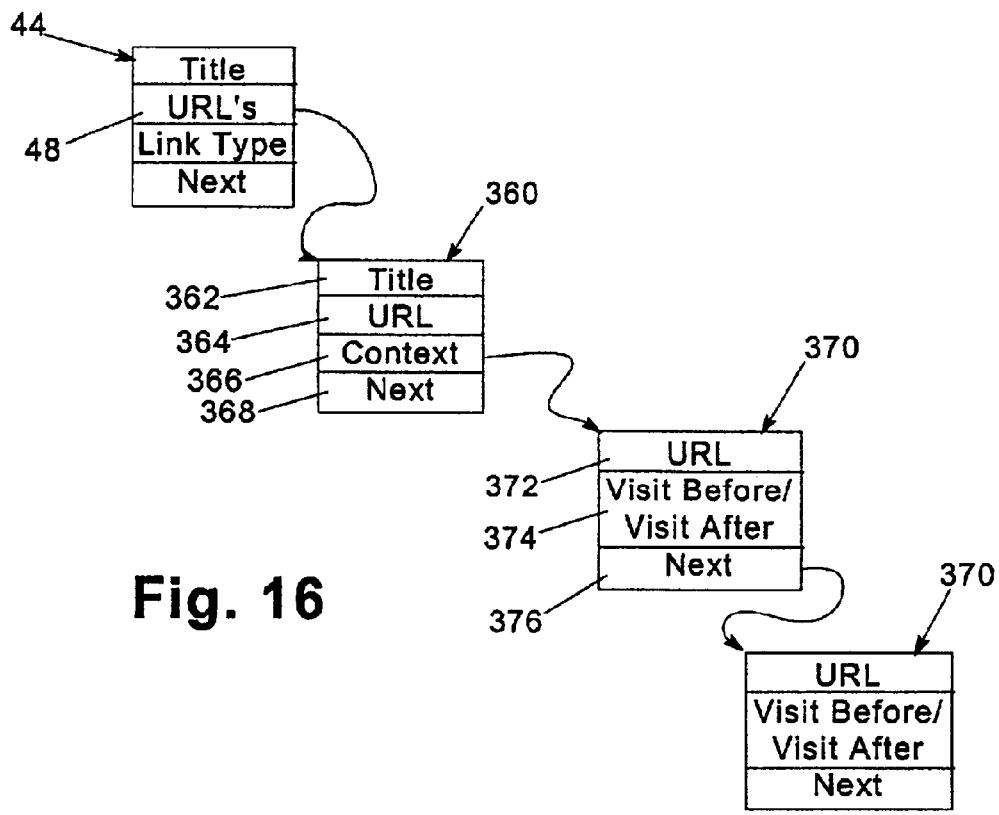
FIG. 16 is a block diagram of a context criteria data structure extension for the bookmark data structure of FIG. 3.

The context criteria for a given multi-target link may be stored in a bookmark structure in the manner illustrated in FIG. 16. As shown in this figure, a bookmark record 44 may have a URL field 48 pointing to an alternate URL record 360 to the URL records 54 illustrated in FIG. 3. For each URL record 360, a title field 362, URL field 364 and next field 368 may serve the same functions as fields 56, 58 and 60 of URL records 54 (FIG. 3). However, each URL record 360 includes an additional context field 366 storing a pointer to a linked list of context URL records 370.

Each context URL record 370 includes a URL field 372 defining the storage location of the context URL. In addition, a visit before/visit after field 374 is used to determine whether a user must visit a target before or after the context URL to meet the context criteria. Field 376 stores a pointer to the next context URL record 370 in the bookmark data structure. The last such record includes a NULL pointer stored in field 376.

Storage of context criteria in a hypertext link definition implementation of a multi-target link may be implemented in any number of manners. For example, it may be desirable to include a "context" field that lists the URL's and their associated flags within the anchor tag described above with respect to Table I, or in other manners suitable for HTML encoding.

Figure 17:
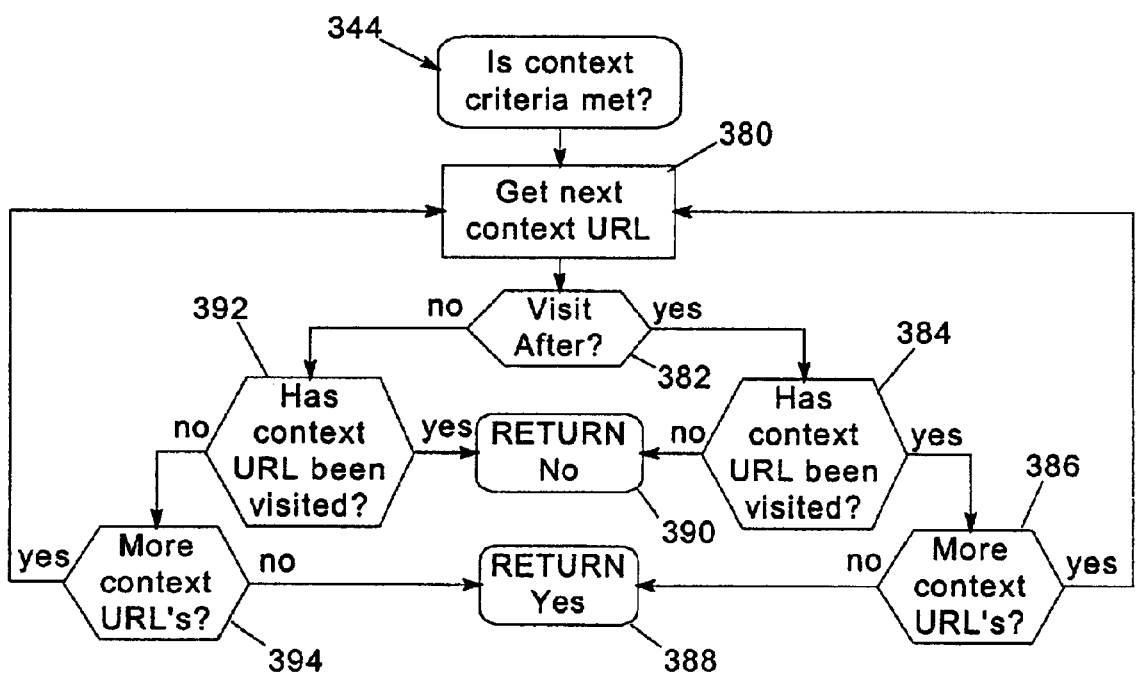
FIG. 17 is a flowchart illustrating the program flow of the "is context criteria met?" routine of FIG. 15.

Routine 344 referenced in FIG. 15 is illustrated in greater detail in FIG. 17. This routine begins in block 380 by getting the next context URL for the current target URL, starting with the first such context URL. Once the next context URL is retrieved, control passes to block 382 to determine whether the visit after flag is set. If so, control passes to block 384 to determine whether the context URL has already been visited, e.g., by searching the local history cache for a document matching the context URL. If the context URL has been visited, the context criteria in this respect has been met, and control passes to block 386 to determine whether more context URL's exist for the target URL being analyzed. If so, control passes back to block 380 to analyze such additional context URL's. If all context URL's have been processed, block 386 passes control to block 388 to return a "YES" value, indicating that the context criteria for the target has been met.

Returning to block 384, if the context URL has not yet been visited, the context criteria for the target URL has not been met. Thus, block 384 passes control to block 390 to return a "NO" value and terminate the routine.

Returning to block 382, if the visit after flag is not set, control passes to block 392 to determine whether the context URL has already been visited. If so, the context criteria is not met, and control passes to block 390 to return a "NO" value and terminate the routine. If the context URL has not been visited, control instead passes to block 394 to determine whether additional context URL's need to be analyzed. If so, block 394 passes control to block 380 to process the additional URL's. If not, however, the context criteria has been satisfied, and control is passed to block 388 to terminate the routine and return a "YES" value.

It should be appreciated that other context criteria may be utilized in the alternative, e.g., various boolean logic statements and other more complex inquiries.

Sanctioned Link

Figure 18:
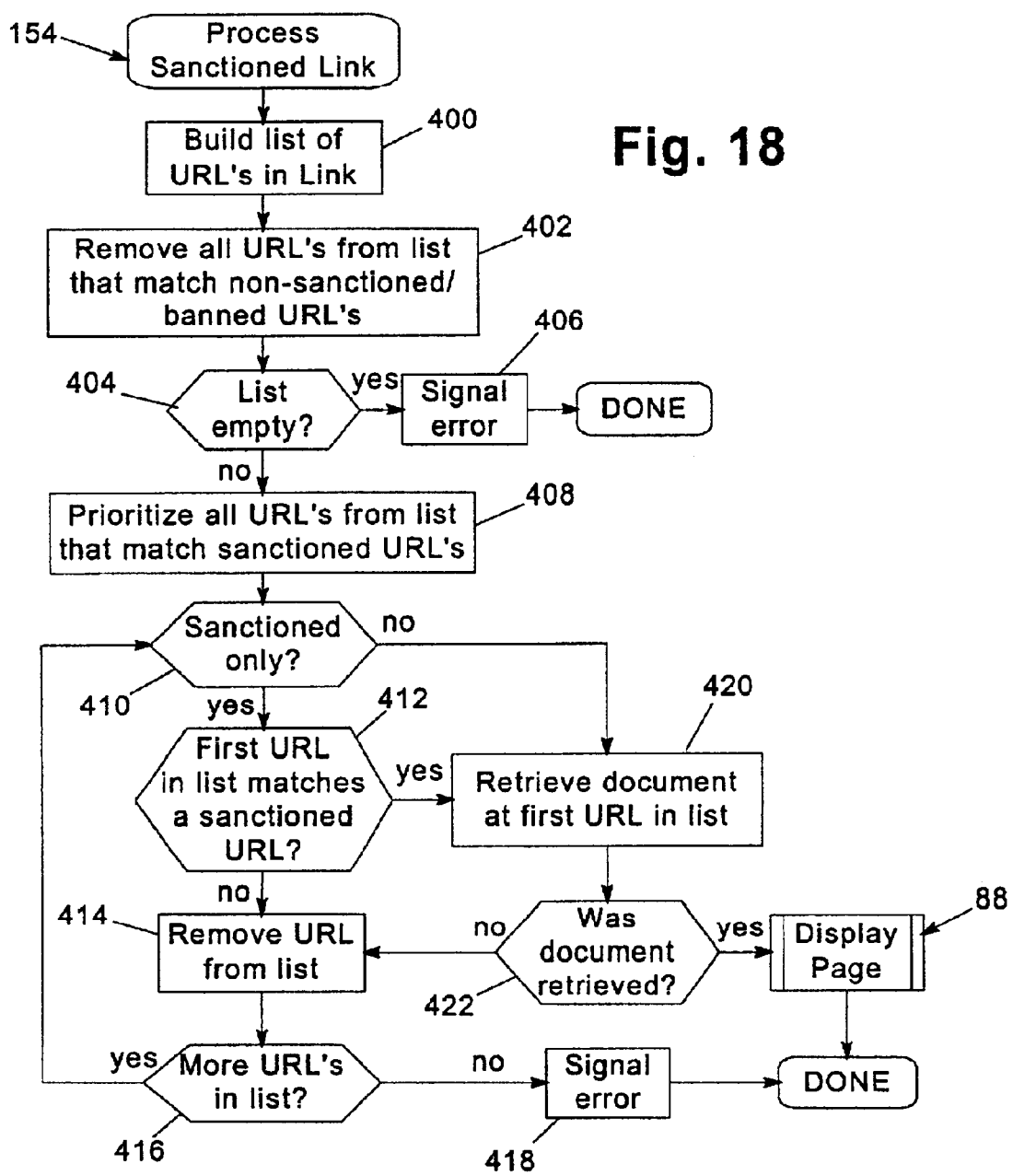
FIG. 18 is a flowchart illustrating the program flow of the process sanctioned link routine of FIG. 5.

Process sanctioned link routine 154 is illustrated in greater detail in FIG. 18. A sanctioned link represents a link having a plurality of target URL's that may be explicitly sanctioned and/or unsanctioned such that any such target is favored or disfavored relative to other targets in the link. A user's previous navigational history may be used in determining whether or not a particular target is sanctioned or unsanctioned. For example, anytime a user located a particularly helpful or unhelpful site, the user could add such information to a list of sanctioned or non-sanctioned sites. In the alternative, a third-party sanctioning authority may be utilized to sanction or unsanction given target URL's. The third party may be another user, or may be a special interest group of some sort having an expertise in a particular area.

Sanctioned or unsanctioned URL's may be fully specified, or in the alternative may be partially specified, e.g., using a wild card. For example, for computer information, it may be known that anything on the IBM web site is useful information for a given user. Thus, a sanctioning criteria may be represented by the wild card "www.ibm.*", such that any target in any IBM domain is favored. Likewise, a domain name may be utilized to sanction or unsanction a given list of documents. For example, if a domain name is known to host pornographic material, any target directed to that domain may be explicitly unsanctioned to prevent the user from retrieving such material.

Sanctioning information may be useful, for example, for users to share their prior experiences to assist other users in locating useful links. Also, a special interest group may recommend certain links to users. For example, a user may wish to activate a multi-target link that points at several links defining treatment recommendations for various types of cancer. The user may want the information to be credible, and may only want to see links sanctioned by a group such as the Mayo Clinic. It should be appreciated that a wide variety of other uses of sanctioning information may be envisioned.

In the illustrated embodiment, sanctioning information is maintained as a sanctioned list indicating for each entry whether or not the URL associated therewith (or any wild card URL fragment) is explicitly sanctioned or non-sanctioned. To process such information, routine 154 begins in block 400 by building a list of URL's in the link to be activated. Next, block 402 removes all URL's from the list that match any non-sanctioned, or banned URL's in the sanctioned list. Next, block 404 determines whether the list is empty. If so, no document should be retrieved, and control passes to block 406 to signal an error to the user, and terminate the routine.

If the list is not empty, however, control passes to block 408 to prioritize all URL's from the list that may match any sanctioned URL's. Control then passes to block 410 to determine whether a "sanctioned only" setting is enabled for the user. As an example, it may be desirable to view only sanctioned sites, or in the alternative, to merely prioritize those sites relative to other sites.

If only sanctioned sites should be viewed, block 410 passes control to block 412 to determine whether the first URL in the list matches a sanctioned URL. If not, control passes to block 414 to remove the URL from the list, and then to block 416 to determine whether additional URL's remain in the list. If so, control returns to block 410 to process the additional URL's. If not, however, control is passed to block 418 to signal an error to the user, and subsequently terminate the routine.

If the first URL in the list matches a sanctioned URL, block 412 instead passes control to block 420 to retrieve the document at the first URL in the list. In addition, returning to block 410, if the sanctioned only option is not set, control is passed directly to block 420. Next, block 422 determines whether retrieval of the document was successful. If so, display page routine 88 is called, and routine 154 is complete. If not, however, control passes to block 414 to remove the URL from the list and process any additional URL's, if such URL's exist. Routine 154 is then complete.

Cyclic Link

Figure 19:
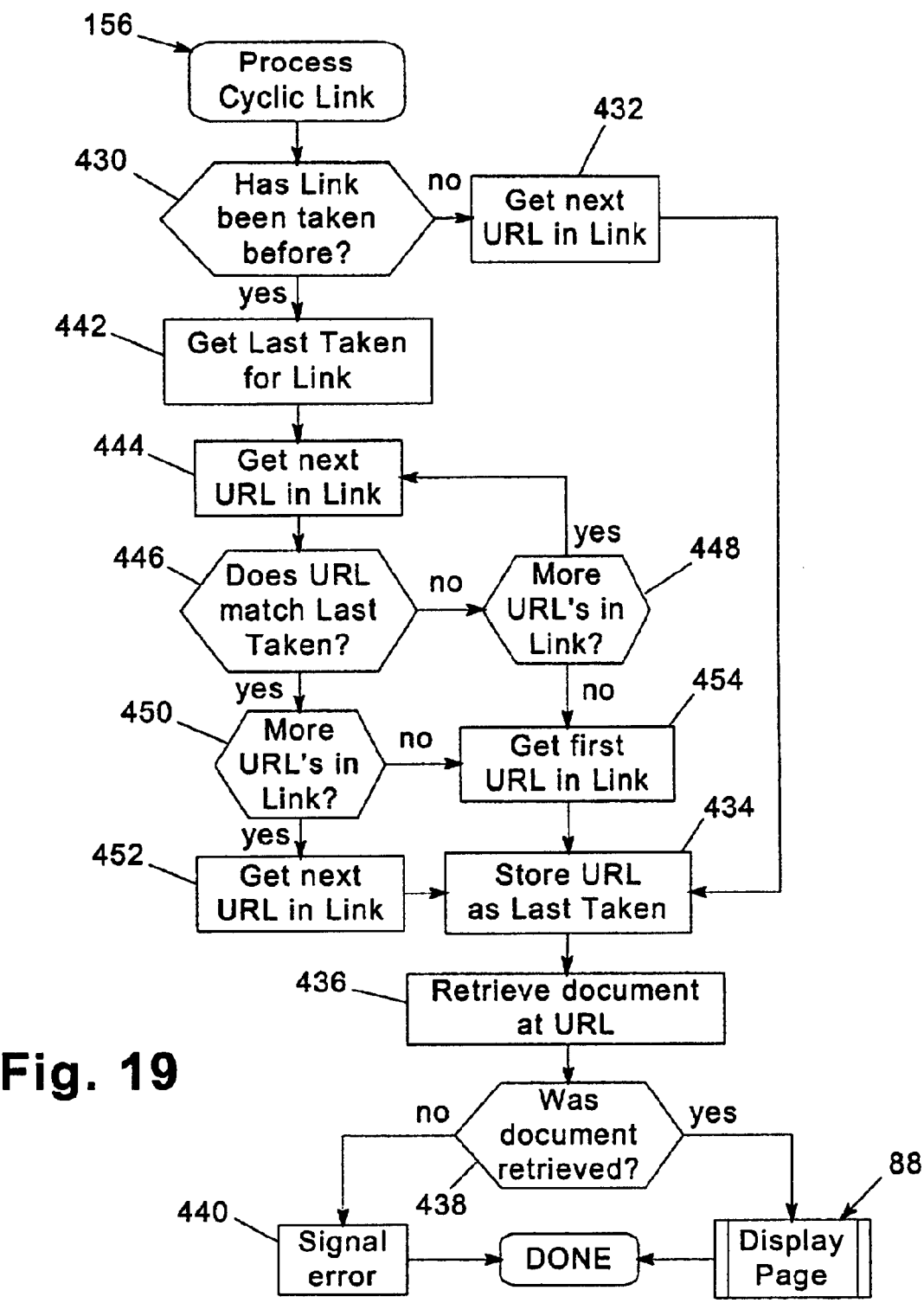
FIG. 19 is a flowchart illustrating the program flow of the process cyclic link routine of FIG. 5.

Process cyclic link routine 156 is illustrated in greater detail in FIG. 19. A cyclic link is simply a link that uses the next target URL in the link each time the link is taken. Moreover, it may be desirable to wrap around to the first target URL after the last target URL in the link has been selected. Among other uses, this type of link is useful for enabling a document author to organize a series of targets in a predetermined order and have the user view each target in sequence according to the wishes of the author.

Routine 156 begins in block 430 by determining whether the link has been taken before. This may be performed, for example, by analyzing a last taken variable associated with the link. If the link has not been taken before, control passes to block 432 to get the next URL in the link, starting with the first such URL. Control then passes to block 434 to store the URL as the last taken for the link. Next, block 436 attempts to retrieve the document at the URL, and block 438 determines whether the document retrieval was successful. If so, display page routine 88 is called, and routine 156 is complete. If not, an error is signaled to the user in block 440 and routine 156 terminates.

Returning to block 430, after the first URL has been selected for the link, block 430 determines that the link has been taken before, and control passes to block 442 to retrieve the last taken variable for the link. Next, block 444 begins a loop to cycle through the next URL in the link (starting with the first) until the URL matches the URL stored as the last taken for the link. Specifically, block 444 passes control to block 446 to determine whether the URL retrieved in block 444 matches the last taken. As long as it does not, control passes to block 448 to determine whether additional URL's remain in the link to be processed. If so, control returns to block 444.

Once the URL matches the last taken, control passes to block 450 to determine whether more URL's exist in the link. If so, control passes to block 452 to get the next URL in the link, and then to block 434 to store the URL as the last taken for the link. Returning to block 450, if no more URL's exist in the link, the last URL for the link was previously taken, so control passes to block 454 to get the first URL in the link, and thereby wrap around to the start of the list of target URL's for the link. Also, returning to block 448, if it is detected that no more URL's exist in the link, control passes to block 454.

Multi-Visit Link

Figure 20:
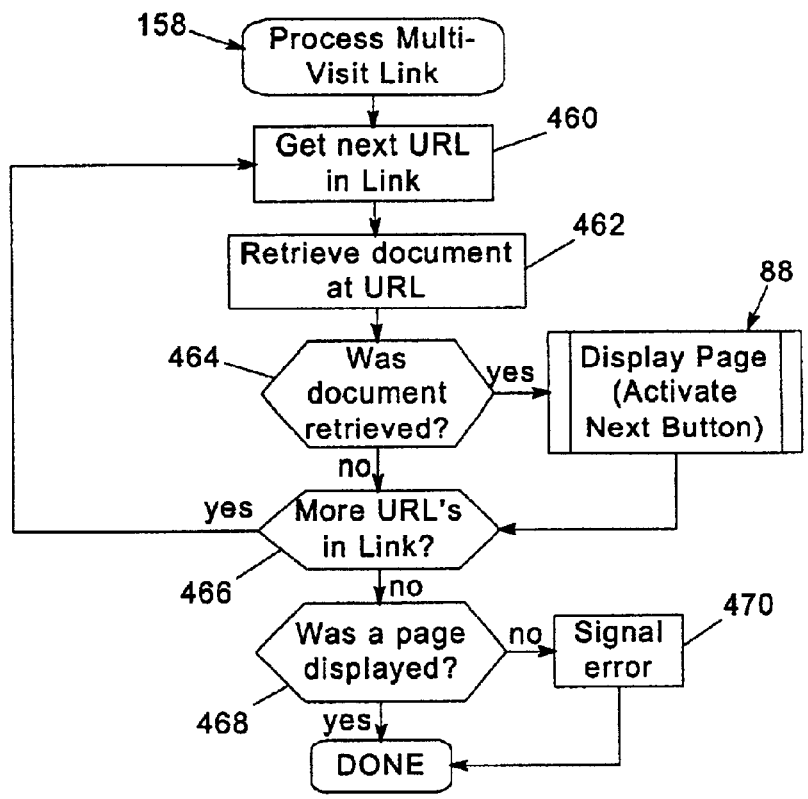
FIG. 20 is a flowchart illustrating the program flow of the process multivisit link routine of FIG. 5.

Process multi-visit link routine 158 is illustrated in greater detail in FIG. 20. A multi-visit link is similar in many respects to a cyclical link in that a sequence of target URL's are selected in order. However, rather than requiring a user to return to a document within which a multi-target link is defined to select the next link, a multi-visit link enables multiple targets to be viewed directly in sequence. The next URL for a link may be selected, for example, by the user depressing "BACK" button for the browser, and attempting to return to the original document. As an alternative to, or in addition to a "BACK" button, a separate "NEXT" button may be displayed to permit the user to sequence between a plurality of targets. Other manners of sequencing between multiple targets may be used in the alternative.

Routine 158 begins in block 460 by getting the next URL in the link, starting with the first. Next, in block 462, the document stored at the URL is retrieved. Next, block 464 determines whether the document retrieval was successful. If so, display page routine 88 is called, including activating the "NEXT" button display option for the browser (discussed in greater detail below). Routine 88 is configured to return to routine 158 upon depression of the "NEXT" button, or in the alternative, depression of the "BACK" button for the browser. Upon return from routine 88, or if the document retrieval is determined to not be successful in block 464, control then passes to block 466 to determine whether additional URL's exist in the link. If so, control passes to block 460 to get the next URL for the link. If, however, no additional URL's remain, control passes to block 468 to determine whether a page was successfully displayed—that is, whether the display page routine 88 was called from routine 158. If so, no error occurred, and routine 158 is terminated. If no page was displayed, however, block 470 is called to signal an error prior to terminating the routine. It should also be appreciated that it may be desirable to permit a user to wrap around to the first target after the last target in the link has been viewed.

Multi-Launch Link

Figure 21:
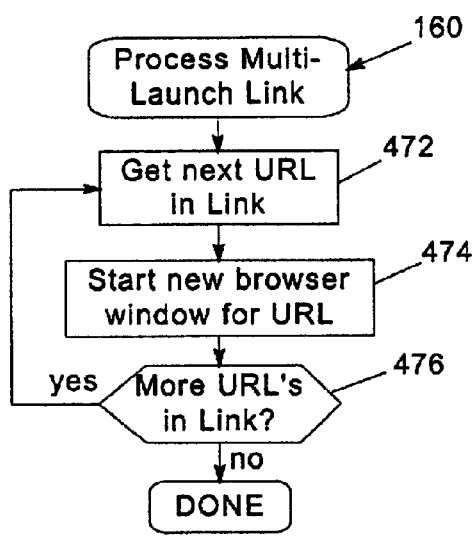
FIG. 21 is a flowchart illustrating the program flow of the process multilaunch link routine of FIG. 5.

Process multi-launch link routine 160 is illustrated in greater detail in FIG. 21. With a multi-launch link, the browser is configured to bring up a separate window for each target URL in the link. This permits the user to follow multiple paths at once in a fast and efficient manner.

Routine 160 begins in block 472 by getting the next URL in the link, starting with the first. Next, block 474 starts a new browser window for that URL. Block 476 then determines whether additional URL's exist in the link, and if so, returns control to block 472 to process such additional URL's. Once all URL's for the link have been processed, routine 160 terminates.

As an alternative, the first URL for a link may be opened into the current window, with additional documents retrieved into new windows. Moreover, various formatting options, including tiling and cascading, may also be used to format the information returned to the user.

Display of Multi-Target Links

Figure 22:
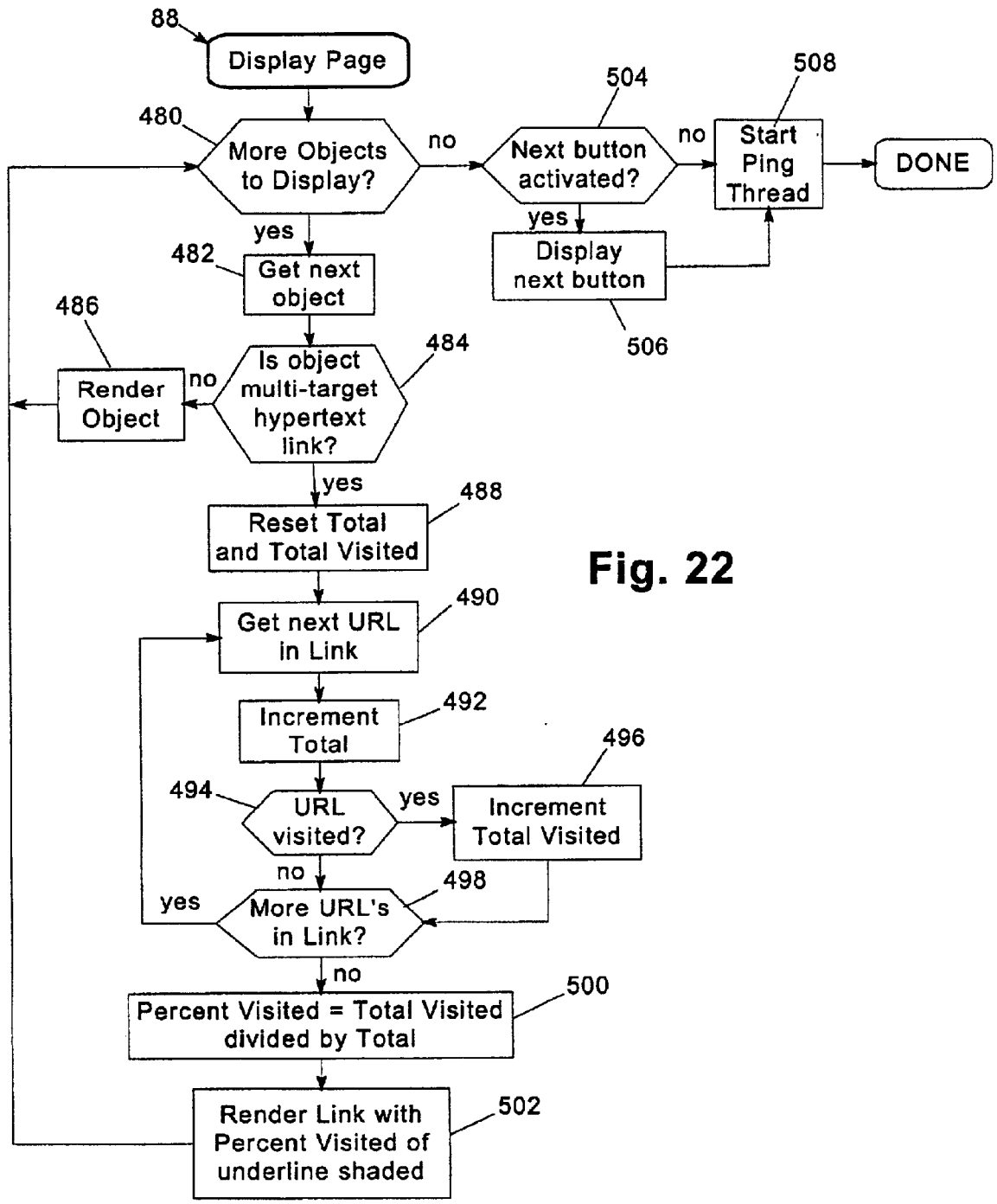
FIG. 22 is a flowchart illustrating the program flow of the display page routine of FIG. 4.

Display page routine 88 is illustrated in greater detail in FIG. 22. Routine 88 principally operates to render and display on a computer display a given hypertext document supplied to the routine. Routine 88 begins in block 480 by beginning a WHILE loop that renders each HTML object in a hypertext document and displays the information on a computer display. For each such object, control passes to block 482 to get the next object from the document. Next, block 484 determines whether the object is a multi-target hypertext link. If not, control passes to block 486 to render the object in a conventional manner using an HTML-based rendering engine. Control then returns to block 480 to process additional objects.

If, however, the object is a multi-target hypertext link, control passes to block 488 to reset a pair of variables, denoted "total" and "total visited". The "total" variable represents the total number of targets for the multi-target link. The "total visited" variable represents the number of such targets that have been previously viewed by the user.

Once these variables have been reset, control passes to block 490 to initiate a loop to process each URL for the link, starting with the first URL therefor. Next, block 492 increments the "total" variable, and block 494 determines whether the current URL has been visited. If so, control passes to block 496 to increment the "total visited" variable and then to block 498 to determine whether additional URL's remain to be processed in the link. Returning to block 494, if the URL was not visited, block 496 is bypassed, and control passes directly to block 498.

If additional URL's exist in the link, block 498 returns control to block 490. If all URL's have been processed, however, control passes to block 500 to calculate the percent visited, represented by the ratio of the "total visited" and "total" variables. Based upon the percent visited variable, block 502 then renders the link with a portion of the underline in the display representation of the hypertext link shaded according to the percent visited variable. Control then returns to block 480 to process additional objects.

Once all objects in the hypertext document have been processed, block 480 passes control to block 504 to determine whether the "NEXT" button activated flag has been set (typically as a result of activation of a multi-visit link as described above in connection with FIG. 20). If the button is activated, control passes to block 506 to display the "NEXT" button. Next, block 508 is executed to start the "ping" thread for the current hypertext document, to perform the background "ping" function described above. Also, if the "NEXT" button is not activated, block 504 passes control directly to block 508. Upon completion of block 508, routine 88 is complete.

Figure 23:
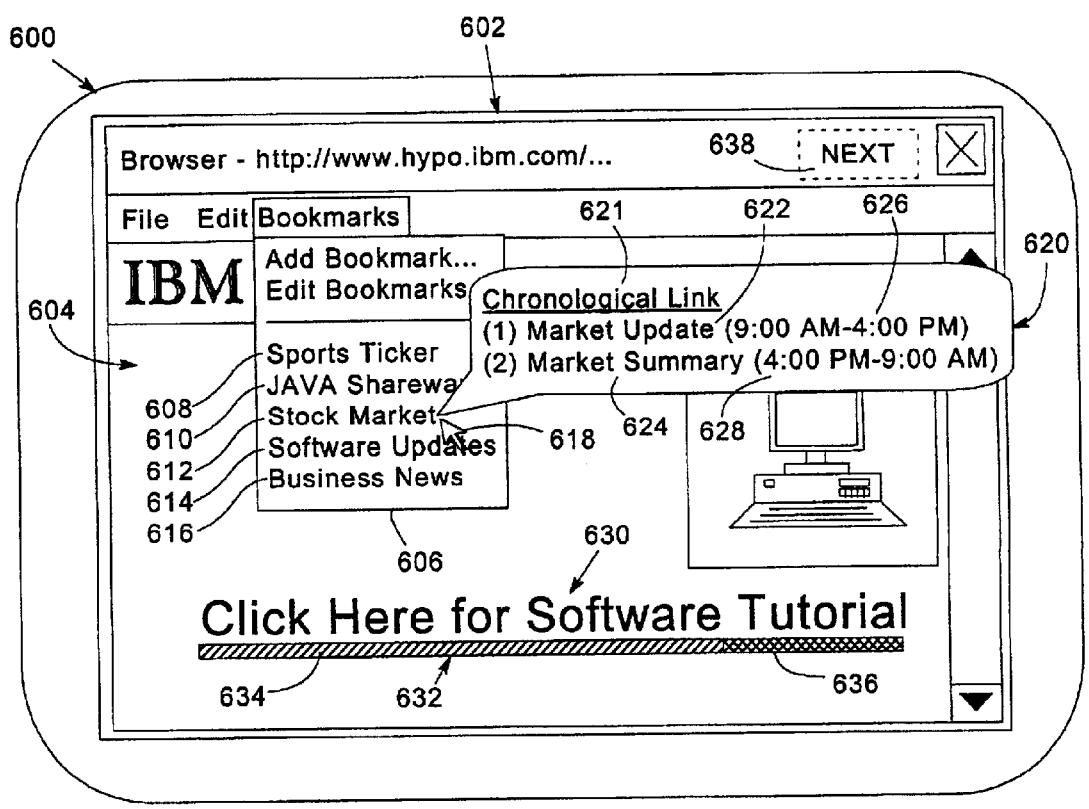
FIG. 23 is a block diagram of an exemplary computer display illustrating the operation of the browser of FIG. 2.

FIG. 23 illustrates a representative computer display 600 illustrating several unique aspects of the invention. Displayed within display 600 is a window 602 for browser 41, within which is displayed a display representation of a hypertext document 604. Also illustrated is a bookmark list 606 including a plurality of bookmarks 608, 610, 612, 614 and 616.

A pointer 618 is shown disposed over the display representation of bookmark 612. As discussed above with respect to FIG. 4, one event that may be handled by the browser is the focus being placed on a particular bookmark, wherein response thereto the type and list of URL's for the bookmark is displayed in a pop-up window. As an example, sample data for bookmark 612 is shown below in Table II:

TABLE II

Exemplary Multi-Target Bookmark

| Title | | Stock Market | |
| Link Type | | CHRONOLOGICAL | |
| --- | --- | --- | --- |
| Target URL's | Title | URL | Criteria |
| (1) | Market Update | www.somemarket.com/current.html | (Time >= 9:00) & (Time < 16:00) |
| (2) | Market Summary | www.somemarket.com/summary.html | (Time >= 16:00) & (Time < 9:00) |

In response to pointer 618 being disposed over the bookmark, a pop-up window 620 is displayed, within which is displayed a link type at 621, as well as each target, represented at 622 and 624. It may further be desirable to display the criteria associated with the link, here represented at 626 and 628. It should be appreciated that any alternate arrangement of information may also be displayed in pop-up window 620 in the alternative. Moreover, it may be desirable to permit a user to direct access any of the URL's displayed in the pop-up menu, e.g., by permitting the user to position the pointer over the desired URL and depressing the mouse button.

Also illustrated in FIG. 23 is a display representation 630 of a multi-link hypertext link, e.g., using the data shown below in Table III:

TABLE III

Exemplary Multi-Target Hypertext Link

```
<A
    HTYPE = "MULTIVISIT"
    HREF = "www.hypo.ibm.com/lesson1.html"
    HREF = "www.hypo.ibm.com/lesson2.html"
    HREF = "www.hypo.ibm.com/lesson3.html"
    HREF = "www.hypo.ibm.com/lesson4.html"
>
    Click Here for Software Tutorial
</A>
```

As discussed above with respect to FIG. 22, the underline that is characteristically used to identify a hypertext link, here represented at 632, is partitioned into first and second regions abutting one another along a common axis. The relative lengths of such regions are sized to respectively indicate the percentage of the targets for the multi-target link from which data has been previously accessed, represented at 634 and 636. Here, it is assumed that the user has visited three of the four targets in the multi-visit link. Thus, region 634 represents ¾ of the bar, while region 636 represents ¼ of the bar.

It should be appreciated that alternate manners of displaying the relative percentage of targets visited may be used in the alternative. For example, a vertical bar may be displayed, as may any number of icons and/or numerical indicators. Furthermore, such percentage information may be displayed in a pie graph-type icon, and may be displayed in a pop-up menu, e.g., in connection with the link type and list of URL's that are displayed when the pointer is disposed over the display representation of the hypertext link definition. Other user interface mechanisms may also be used in the alternative.

Also shown in phantom in FIG. 23 is a "NEXT" button 638. While typically not illustrated in connection with the display of document 604, such a button would be displayed in response to a user viewing any of the targets for the hypertext link definition of Table III. Other user interface controls may also be used in the alternative.

Various additional features may be supported in certain implementations. For example, it may be desirable to permit users to add and/or edit bookmarks to manually create multi-target links therefrom. Moreover, it may be desirable to permit a user to open a dedicated window containing a list of the targets for any particular bookmark or hypertext link definition implementation of a multi-target link, thereby permitting a user to directly access any such target. Among other user interface mechanisms, it may be desirable to permit a user to open such a list in response to directly clicking on the bar beneath a particular link.

Various additional modifications may be made to the illustrated embodiments without depart departing from the spirit and scope of the invention. Therefore, the invention lies in the claims hereinafter appended.

What is claimed is:

1. A method of accessing data with a computer, comprising:
    (a) displaying a display representation of a multi-target link, wherein the multi-target link includes identifiers for a plurality of storage locations associated with the multi-target link, wherein the multi-target link is defined in one of a displayed document and a data structure for a bookmark, and wherein the identifiers for the plurality of storage locations are stored in the one of the displayed document and the data structure for the bookmark;
    (b) receiving user input directed to the multi-target link; and
    (c) in response to receiving the user input, automatically selecting at least one of the identifiers for the plurality of storage locations and accessing data stored at a selected one of the plurality of storage locations that is associated with the selected identifier.

2. The method of claim 1, wherein the multi-target link is defined in a hypertext document by a multi-target hypertext link definition, the method further comprising displaying a display representation of the hypertext document.

3. The method of claim 2, wherein the data stored at the selected storage location includes a second hypertext document, wherein the first and second hypertext documents are defined in Hypertext Markup Language (HTML), and wherein the multi-target hypertext link definition is delimited with a HTML tag.

4. The method of claim 1, wherein the multi-target link is defined in one of a plurality of bookmarks in a bookmark list.

5. The method of claim 1, wherein the plurality of storage locations are identified by Uniform Resource Locators (URL's).

6. The method of claim 1, wherein accessing data at the selected storage location includes retrieving a hypertext document stored at the selected storage location.

7. The method of claim 1, wherein accessing data stored at the selected storage location includes attempting to access data at a first storage location in the plurality of storage locations, and thereafter attempting to access data at a second storage location in the plurality of storage locations if the attempt to access data at the first storage location is unsuccessful.

8. The method of claim 7, further comprising determining whether the data at the first storage location is accessible prior to receiving the user input directed to the multi-target link.

9. The method of claim 1, wherein selecting the selected identifier is based upon a predetermined selection criteria.

10. A method of accessing data with a computer, comprising:
    (a) receiving user input directed to a multi-target link, the multi-target link identifying a plurality of storage locations associated therewith;
    (b) in response to receiving the user input, accessing data stored at a selected one of the plurality of storage locations; and
    (c) selecting the selected storage location from the plurality of storage locations based upon a predetermined selection criteria, wherein the multi-target link is defined in a hypertext document by a multi-target hypertext link definition, and wherein the predetermined selection criteria is based at least in part on data embedded in the multi-target hypertext link definition.

11. The method of claim 9, wherein the predetermined selection criteria is based at least in part on the relative access times of files respectively stored at the plurality of storage locations.

12. The method of claim 11, further comprising determining which of the plurality of storage locations has a shortest access time by pinging each storage location to determine a response time therefor, and wherein selecting the selected identifier includes selecting as the selected identifier the identifier for the storage location having the fastest response time.

13. The method of claim 11, further comprising determining which of the plurality of storage locations has the shortest access time by retrieving data from each storage location to determine a transfer rate therefor, and wherein selecting the selected identifier includes selecting as the selected identifier the identifier for the storage location having the highest transfer rate.

14. The method of claim 9, wherein the predetermined selection criteria is based at least in part on the relative sizes of files respectively stored at the plurality of storage locations.

15. The method of claim 9, wherein the predetermined selection criteria is based at least in part on the relative ages of files respectively stored at the plurality of storage locations.

16. The method of claim 15, further comprising determining which of the plurality of storage locations is the most recent by determining a last update time for the file stored at each storage location, and wherein selecting the selected identifier includes selecting as the selected identifier the identifier for the storage location associated with the file having the most recent last update time.

17. The method of claim 9, wherein the predetermined selection criteria is based at least in part on a predetermined chronological criteria.

18. The method of claim 17, wherein each storage location has a predetermined chronological condition, and wherein selecting the selected identifier includes selecting as the selected identifier the identifier for the storage location in which at least one of a current system time and current system date meets the predetermined chronological condition thereof.

19. The method of claim 9, wherein the predetermined selection criteria is based at least in part on a previously-viewed status of each of the plurality of storage locations.

20. The method of claim 19, further comprising determining the previously-viewed status of each of the plurality of storage locations by accessing a local cache.

21. The method of claim 19, further comprising determining the previously-viewed status of each of the plurality of storage locations by accessing a local bookmark list.

22. The method of claim 9, wherein the predetermined selection criteria is based at least in part on the relative popularity of each of the plurality of storage locations.

23. The method of claim 22, further comprising determining the relative popularity of each of the plurality of storage locations by retrieving a hit indicator for each of the plurality of storage locations, and wherein selecting the selected identifier includes selecting as the selected identifier the identifier for the storage location having the highest hit indicator.

24. The method of claim 9, wherein the predetermined selection criteria is based at least in part on a local user setting.

25. The method of claim 24, wherein the local user setting includes a language setting that indicates a predetermined language, and wherein selecting the selected identifier includes selecting as the selected identifier the identifier for the storage location at which is stored a file that displays information to a user in the predetermined language.

26. The method of claim 24, wherein the local user setting includes a character set setting that indicates a predetermined character set, and wherein selecting the selected identifier includes selecting as the selected identifier the identifier for the storage location at which is stored a file that displays information to a user in the predetermined character set.

27. The method of claim 24, wherein the local user setting includes at least one of a capability of a browser program used to view the accessed data, and a version type desired to be displayed by the browser program.

28. The method of claim 24, wherein the local user setting includes a skill level of a user.

29. The method of claim 9, wherein the predetermined selection criteria is based at least in part on a version type of a hypertext document stored at one of the plurality of storage locations.

30. The method of claim 29, wherein the version type is selected from the group consisting of a text-only version type, a graphics version type, a Java version type, a non-Java version type, a scripted version type, a non-scripted version type, and combinations thereof.

31. The method of claim 9, wherein the predetermined selection criteria is based at least in part on a predetermined context criteria representing a current context upon receipt of the user input directed to the multi-target link.

32. The method of claim 31, wherein the predetermined context criteria is based at least in part on a previously-viewed status of each of a plurality of associated hypertext links.

33. The method of claim 32, wherein the plurality of associated hypertext links are defined in a currently-viewed hypertext document.

34. The method of claim 9, wherein the predetermined context criteria is based at least in part on a sanctioned status for each of the plurality of storage locations.

35. The method of claim 34, further comprising determining the sanctioned status for each of the plurality of storage locations by accessing a list of sanctioned storage locations, and wherein selecting the selected identifier includes selecting as the selected identifier the identifier for a storage location in the plurality of storage locations that is also found in the list of sanctioned storage locations.

36. The method of claim 35, wherein the list of sanctioned storage locations is maintained by a third party.

37. The method of claim 35, wherein the list of sanctioned storage locations includes at least one wildcard entry, and wherein selecting the selected identifier further includes determining that a predetermined storage location is found in the list of sanctioned storage locations by comparing the predetermined storage location with the wildcard entry.

38. The method of claim 34, further comprising determining the sanctioned status for each of the plurality of storage locations by accessing a list of unsanctioned storage locations, and wherein selecting the selected identifier includes inhibiting selection of any storage location in the plurality of storage locations that is also found in the list of unsanctioned storage locations.

39. The method of claim 9, wherein the plurality of storage locations are organized into a predetermined sequence, and wherein selecting the selected identifier includes selecting as the selected identifier an identifier for a next storage location in the predetermined sequence.

40. The method of claim 39, wherein selecting as the selected identifier further includes selecting as the selected identifier the identifier for the first storage location in the predetermined sequence if no next storage location exists in the predetermined sequence.

41. The method of claim 9, wherein the plurality of storage locations are organized into a predetermined sequence, the method further comprising sequentially accessing data at each storage location in the predetermined sequence in response to user input.

42. The method of claim 41, wherein the multi-target link is defined in a first hypertext document, wherein sequentially accessing data at each storage location is performed in response to user input to return to the first hypertext document.

43. The method of claim 1, further comprising accessing data stored at each additional storage location in the plurality of storage locations.

44. The method of claim 1, further comprising:
indicating on the display representation of the multi-target link a percentage of the plurality of storage locations from which data has been accessed.

45. The method of claim 44, wherein indicating the percentage of the plurality of storage locations from which data has been accessed comprises displaying a bar having visually distinct first and second regions abutting one another along a common axis, with the relative lengths of the first and second regions sized to respectively indicate the percentage of the plurality of storage locations from which data has been accessed, and the percentage of the plurality of storage locations from which data has not been accessed.

46. The method of claim 45, further comprising displaying a list of the plurality of storage locations in response to user input directed to the bar.

47. The method of claim 1, further comprising displaying in a direct access list a display representation of at least a portion of the plurality of storage locations, and accessing data at one of the plurality of storage locations in response to user input directed to the display representation of the one of the plurality of storage locations.

48. A method of accessing a hypertext document, comprising:
  (a) displaying a display representation of at least a portion of a first hypertext document on a computer display;
  (b) displaying a display representation of a multi-target hypertext link defined in the first hypertext document on the computer display, the multi-target hypertext link including a plurality of Uniform Resource Locators (URL's) associated therewith and defined in the first hypertext document; and
  (c) in response to user input directed to the display representation of the multi-target hypertext link:
    (1) automatically selecting at least one of the plurality of URL's based upon a predetermined selection criteria; and
    (2) navigating to the selected URL.

49. A method of accessing a hypertext document, comprising:
  (a) displaying display representations of at least a portion of a plurality of bookmarks in a bookmark list, the plurality of bookmarks including a multi-target bookmark identifying a plurality of Uniform Resource Locators (URL's) associated therewith, wherein the plurality of URL's are stored in a data structure for the multi-target bookmark; and
  (b) in response to user input directed to the display representation of the multi-target bookmark:
    (1) automatically selecting at least one of the plurality of URL's based upon a predetermined selection criteria; and
    (2) navigating to the selected URL.

50. An apparatus, comprising:
  (a) a memory;
  (b) a multi-target link resident in the memory, the multi-target link including identifiers for a plurality of storage locations associated therewith, wherein the multi-target link is defined in one of a displayed document and a data structure for a bookmark that is resident in the memory, and wherein the identifiers for the plurality of storage locations are stored in the one of the displayed document and the data structure for the bookmark; and
  (c) a program resident in the memory, the program configured to display a display representation of the multi-target link, and to automatically select at least one of the identifiers for the plurality of storage locations and access data stored at a selected one of the plurality of storage locations that is associated with the selected identifier in response to user input directed to the multi-target link.

51. The apparatus of claim 50, wherein the multi-target link is defined in a hypertext document by a multi-target hypertext link definition.

52. The apparatus of claim 50, wherein the multi-target link is defined in one of a plurality of bookmarks in a bookmark list.

53. The apparatus of claim 50, wherein the program is configured to access data at the selected storage location by retrieving a hypertext document stored at the selected storage location.

54. The apparatus of claim 50, wherein the program is configured to access data stored at the selected storage location by attempting to access data at a first storage location in the plurality of storage locations, and thereafter attempting to access data at a second storage location in the plurality of storage locations if the attempt to access data at the first storage location is unsuccessful.

55. The apparatus of claim 50, wherein the program is configured to select the selected identifier based upon a predetermined selection criteria.

56. The apparatus of claim 55, wherein the predetermined selection criteria is based at least in part on the relative access times of files respectively stored at the plurality of storage locations.

57. The apparatus of claim 55, wherein the predetermined selection criteria is based at least in part on the relative sizes of files respectively stored at the plurality of storage locations.

58. The apparatus of claim 55, wherein the predetermined selection criteria is based at least in part on the relative ages of files respectively stored at the plurality of storage locations.

59. The apparatus of claim 55, wherein the predetermined selection criteria is based at least in part on a predetermined chronological criteria.

60. The apparatus of claim 55, wherein the predetermined selection criteria is based at least in part on a previously-viewed status of each of the plurality of storage locations.

61. The apparatus of claim 55, wherein the predetermined selection criteria is based at least in part on the relative popularity of each of the plurality of storage locations.

62. The apparatus of claim 55, wherein the predetermined selection criteria is based at least in part on a local user setting.

63. The apparatus of claim 1, wherein the local user setting includes at least one of a language setting that indicates a predetermined language, a character set setting that indicates a predetermined character set, a capability of a browser program used to view the accessed data, a version type desired to be displayed by the browser program, and a skill level of a user.

64. The apparatus of claim 55, wherein the predetermined selection criteria is based at least in part on a version type of a hypertext document stored at one of the plurality of storage locations.

65. The apparatus of claim 55, wherein the predetermined selection criteria is based at least in part on a predetermined context criteria representing a current context upon receipt of the user input directed to the multi-target link.

66. The apparatus of claim 55, wherein the predetermined context criteria is based at least in part on a sanctioned status for each of the plurality of storage locations.

67. The apparatus of claim 55, wherein the plurality of storage locations are organized into a predetermined sequence, and wherein the program is configured to select the selected identifier by selecting the identifier for a next storage location in the predetermined sequence.

68. The apparatus of claim 55, wherein the plurality of storage locations are organized into a predetermined sequence, the program further configured to sequentially access data at each storage location in the predetermined sequence in response to user input.

69. The apparatus of claim 50, wherein the program is further configured to access data stored at each additional storage location in the plurality of storage locations.

70. The apparatus of claim 50, wherein the program is further configured to indicate on the display representation of the multi-target link a percentage of the plurality of storage locations from which data has been accessed.

71. The apparatus of claim 50, wherein the program is further configured to display in a direct access list a display representation of at least a portion of the plurality of storage locations, and to access data at one of the plurality of storage locations in response to user input directed to the display representation of the the one of the plurality of storage locations.

72. A program product, comprising:
  (a) a program configured to display a display representation of a multi-target link that includes identifiers for a plurality of storage locations associated therewith, and in response to user input directed to the multi-target link thereto, to automatically select at least one of the identifiers for the plurality of storage locations and access data stored at a selected one of a plurality of storage locations that is associated with the selected identifier, wherein the multi-target link is defined in one of a displayed document and a data structure for a bookmark, and wherein the identifiers for the plurality of storage locations are stored in the one of the displayed document and the data structure for the bookmark; and
  (b) a signal bearing media bearing the program.

73. The program product of claim 72, wherein the signal bearing media comprises at least one of a recordable media and a transmission-type media.

74. A method of generating a hypertext document, the method comprising:
  (a) authoring a hypertext document; and
  (b) embedding within the hypertext document a multi-target hypertext link definition, the multi-target hypertext link definition including identifiers for a plurality of storage locations associated therewith, wherein the identifiers are embedded within the hypertext document.

75. A program product, comprising:
  (a) a hypertext document, the hypertext document having embedded therein at least one multi-target hypertext link definition, the multi-target hypertext link definition including identifiers for a plurality of storage locations associated therewith, wherein the identifiers are embedded within the hypertext document; and
  (b) a signal bearing media bearing the hypertext document.

* * * * *